US012716998B2

(12) United States Patent
Yajnanarayana et al.

(10) Patent No.: US 12,716,998 B2
(45) Date of Patent: Aug. 25, 2026

(54) LANDSCAPE SENSING USING RADIO SIGNALS

(71) Applicant: Telefonaktiebolaget LM Ericsson (publ), Stockholm (SE)

(72) Inventors: Vijaya Yajnanarayana, Bangalore (IN); Dongdong Huang, Nanjing (CN); Deep Shrestha, Linköping (SE); Yi Geng, Nanjing (CN); Ali Behravan, Stockholm (SE); Erik Dahlman, Stockholm (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 354 days.

(21) Appl. No.: 18/558,663

(22) PCT Filed: May 6, 2022

(86) PCT No.: PCT/SE2022/050445
§ 371 (c)(1),
(2) Date: Nov. 2, 2023

(87) PCT Pub. No.: WO2022/235198
PCT Pub. Date: Nov. 10, 2022

(65) Prior Publication Data

US 2024/0230839 A1 Jul. 11, 2024

(30) Foreign Application Priority Data

May 7, 2021 (IN) ............................ 202141020810

(51) Int. Cl.
*G01S 7/41* (2006.01)
*H04L 41/16* (2022.01)
*H04W 24/10* (2009.01)

(52) U.S. Cl.
CPC ............. *G01S 7/411* (2013.01); *H04L 41/16* (2013.01); *H04W 24/10* (2013.01)

(58) Field of Classification Search
CPC ..... H04W 28/00; H04W 24/10; H04W 16/18; H04W 24/02; H04W 24/04; H04W 24/06;
(Continued)

(56) References Cited

U.S. PATENT DOCUMENTS 6,499,006 B1 * 12/2002 Rappaport ......... H04B 17/3913 703/20
8,532,676 B1 9/2013 El-Sallabi
(Continued)

FOREIGN PATENT DOCUMENTS

WO 2015106237 A1 7/2015
WO 2020234902 A1 11/2020
WO WO-2020245834 A1 * 12/2020 ........... G01S 5/0284

OTHER PUBLICATIONS

International Search Report and Written Opinion dated Jun. 16, 2022 for International Application No. PCT/SE2022/050445 filed May 6, 2022; consisting of 15 pages.
(Continued)

*Primary Examiner* — William G Trost, IV
(74) *Attorney, Agent, or Firm* — Weisberg I.P. Law, P.A.

(57) ABSTRACT

Systems and methods for landscape sensing using radio signals are provided. In some embodiments, a base station configured to communicate with a User Equipment (UE) includes a radio interface and processing circuitry configured to: obtain a plurality of channel measurements relating to the UE; and determine a landscape type in which the UE is operating based on the plurality of channel measurements. In this way, the base station can infer the UE's landscape without the need for any new sensor or radar infrastructure requirements. In this way, the signaling need between base stations can be reduced. In some embodiments, smaller
(Continued)

BEGIN

OBTAIN MEASUREMENTS RELATED TO A PATH-GAIN BETWEEN THE UE AND A PLURALITY OF BASE STATIONS INCLUDING THE SERVING BASE STATION
1200

DETERMINE THE LANDSCAPE TYPE BASED ON THE OBTAINED MEASUREMENTS AND A CLASSIFICATION MODEL
1202

END dimension input features will reduce the computational complexity so that it can be implemented on an embedded base station hardware.

16 Claims, 26 Drawing Sheets

(58) Field of Classification Search
CPC ........ H04W 24/08; G01S 7/411; G01S 7/417; G01S 7/006; G06N 5/01; G06N 20/20
See application file for complete search history.

(56) References Cited

U.S. PATENT DOCUMENTS

| | | | | |
|---|---|---|---|---|
| 9,930,558 | B2 * | 3/2018 | Sahin | H04B 7/0695 |
| 2019/0268779 | A1 | 8/2019 | Peroulas et al. | |
| 2020/0259896 | A1 | 8/2020 | Sachs et al. | |
| 2021/0068170 | A1 | 3/2021 | Sadhu et al. | |

OTHER PUBLICATIONS

Aazhang, B., et al.; Key Drivers and Research Challenges for 6G Ubiquitous Wireless Intelligence; 6G Research Visions 1; 6G Flagship, University of Oulu; Sep. 2019; consisting of 36 pages.
Bourdoux, A., et al.; 6G White Paper on Localization and Sensing; arXiv:2006.01779v1; Jun. 2, 2020; Springer; consisting of 38 pages.
Cutler, A., et al.; Random Forests; chapter 5 in Ensemble Machine Learning: Methods and Applications; Jan. 2011; consisting of 21 pages.
Gao, X., et al.; MIMO-SAR: A Hierarchical High-resolution Imaging Algorithm for FMCW Automotive Radar; arXiv:2101.09293v1; Jan. 22, 2021; consisting of 12 pages.
Wu, H., et al.; Automotive SAR for Parking Lot Detection; IEEE; Germany; 2009; consisting of 8 pages.
Strinati, E.C., et al.; 6G: The Next Frontier; arXiv:1901.03239v2; May 16, 2019; consisting of 16 pages.
Tan, D.K.P., et al.; Integrated Sensing and Communication in 6G: Motivations, Use Cases, Requirements, Challenges and Future Directions; 2021 1st IEEE International Online Symposium on Joint Communications & Sensing; Feb. 23, 2021; consisting of 6 pages.
Zhang, S., et al.; Towards Artificial Intelligence Enabled 6G: State of the Art, Challenges, and Opportunities; Computer Networks; vol. 183; Oct. 7, 2020; consisting of 28 pages.
EPO Communication with Extended European Search Report dated Jan. 24, 2025 for Patent Application No. 22799209.6, consisting of 10 pages.

* cited by examiner

DISTRIBUTION OF LANDSCAPE CATEGORIES (A)
0
28.1%
11
25.9%
15
12.5%
4
33.5%

| | BEFORE CLASS-RATIO RE-BALANCING | | AFTER CLASS-RATIO RE-BALANCING | |
|---|---|---|---|---|
| CATEGORY | PRECISION | RECALL | PRECISION | RECALL |
| STREET | 0.68 | 0.66 | 0.82 | 0.76 |
| BARON | 0.60 | 0.36 | 0.49 | 0.61 |
| BUILDING | 0.67 | 0.67 | 0.82 | 0.70 |

LANDSCAPE SENSING USING RADIO SIGNALS

CROSS-REFERENCE TO RELATED APPLICATIONS

This application is a Submission Under 35 U.S.C. § 371 for U.S. National Stage Patent Application of International Application No.: PCT/SE2022/050445, filed May 6, 2022 entitled "LANDSCAPE SENSING USING RADIO SIGNALS," which claims priority to Indian Application No.: 202141020810, filed May 7, 2021, the entireties of both of which are incorporated herein by reference.

The project leading to this application has received funding from the European Union's Horizon 2020 research and innovation program under grant agreement No 101015956.

RELATED APPLICATIONS

This application claims the benefit of Indian patent application serial number 202141020810, filed May 7, 2021, the disclosure of which is hereby incorporated herein by reference in its entirety.

TECHNICAL FIELD

The present disclosure relates to landscape sensing.

BACKGROUND

In order to support new and enhanced use cases such as holographic communication, high precision manufacturing, autonomous driving, etc., the next generation 6G wireless system need to satisfy stringent connectivity, throughput, latency and reliability requirement. In order to support these, the next generation wireless system need to operate in high frequency bands with wider bandwidths. Due to the significant attenuation at these frequencies, the 6G network needs to be densely deployed to provide connectivity. These densely deployed BSs need to collaborate with each other to support 6G use cases.

In order to support the stringent KPIs of the 6G network, not only the distributed nature of deployed nodes need to be exploited fully, but also it is imperative to find newer strategies for network adaptation to counter the UE's extremely dynamic environment in the next generation networks. One such strategy is to employ sensing of UE environments in a distributed way and tailor the network adaptation actions accordingly. If a radar functionality is added on top of the communication infrastructure, then several aspects of the UE environment such as range, Doppler, etc. of the scatters can be detected providing a rich representation of the UE environment.

Therefore, improved systems and methods for sensing landscape are needed.

SUMMARY

Systems and methods for landscape sensing using radio signals are provided. In some embodiments, a base station configured to communicate with a User Equipment (UE) comprises a radio interface and processing circuitry configured to: obtain a plurality of channel measurements relating to the UE; and determine a landscape type in which the UE is operating based on the plurality of channel measurements.

In many sensing applications, typically radio signals are emitted by a radar and from the bounced reflections of the obstacles, inference about the environment is done. Even though radars can be used to sense the landscapes around the user-equipment (UE) such as whether UE is in the forested region, inside buildings, etc., it is not suitable in many wireless applications as many UEs does not have radars in them. Using radar will also increase the cost and power requirements on the UEs in applications requiring sensing of the landscapes. In some embodiments of the current disclosure, a mechanism is provided where a base-station (BS) is able to sense the UE's landscape without the use of a radar. In some embodiments, an artificial intelligence (AI) based approach is proposed with suitable choice of the features derived from the wireless channel to infer the landscape of the UEs. Results for the proposed methods applied to practical environments such as London city scenario yields a precision score of more than 95 percent.

Sensing the landscape around the UE can aid the network in taking appropriate actions to optimize performance. An AI based detector at the edge, which exploits the dense deployment of the future networks to arrive at the inference on the landscape sensing is proposed.

In all the prior-art on landscape sensing methods, UEs need external support from one or more entities such as sensors, radars, dedicated signaling, GIS servers, etc. This limits the applicability of these methods for all UEs under all scenarios. To the best of our knowledge, this is the first work which proposes a method where the BSs can infer about the UE's landscape without the need for any new sensor or radar infrastructure requirements.

In all the prior-art that exists for landscape sensing methods, UEs need support from one or more external entities such as sensors, radars, dedicated signaling, GIS servers, etc. This limits the applicability of these methods for all UEs under all scenarios. To the best of our knowledge, this is the first work which proposes a method where the BSs can infer about the UE's landscape without the need for any new sensor or radar infrastructure requirements.

BRIEF DESCRIPTION OF THE DRAWINGS

The accompanying drawing figures incorporated in and forming a part of this specification illustrate several aspects of the disclosure, and together with the description serve to explain the principles of the disclosure.

FIG. 8 shows the ratios of these regions in the section of the map of London city considered for the simulation, according to some embodiments of the present disclosure;

DETAILED DESCRIPTION

Figure 1:
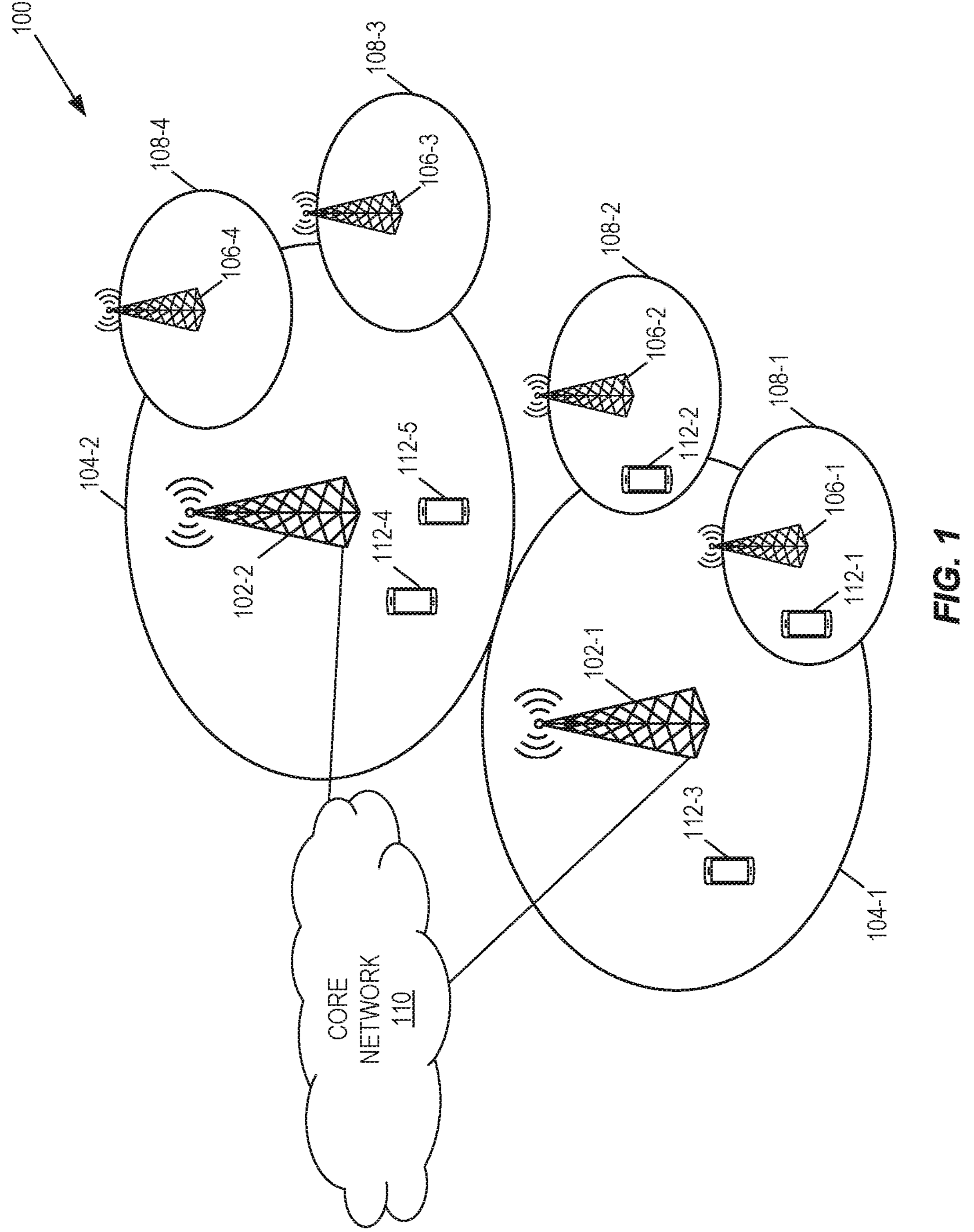
FIG. 1 illustrates one example of a cellular communications system according to some embodiments of the present disclosure.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless communication device.

Radio Access Node: As used herein, a "radio access node" or "radio network node" or "radio access network node" is any node in a Radio Access Network (RAN) of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), a relay node, a network node that implements part of the functionality of a base station or a network node that implements a gNB Distributed Unit (gNB-DU)) or a network node that implements part of the functionality of some other type of radio access node.

Core Network Node: As used herein, a "core network node" is any type of node in a core network or any node that implements a core network function. Some examples of a core network node include, e.g., a Mobility Management Entity (MME), a Packet Data Network Gateway (P-GW), a Service Capability Exposure Function (SCEF), a Home Subscriber Server (HSS), or the like. Some other examples of a core network node include a node implementing an Access and Mobility Function (AMF), a User Plane Function (UPF), a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like.

Communication Device: As used herein, a "communication device" is any type of device that has access to an access network. Some examples of a communication device include, but are not limited to: mobile phone, smart phone, sensor device, meter, vehicle, household appliance, medical appliance, media player, camera, or any type of consumer electronic, for instance, but not limited to, a television, radio, lighting arrangement, tablet computer, laptop, or Personal Computer (PC). The communication device may be a portable, hand-held, computer-comprised, or vehicle-mounted mobile device, enabled to communicate voice and/or data via a wireless or wireline connection.

Wireless Communication Device: One type of communication device is a wireless communication device, which may be any type of wireless device that has access to (i.e., is served by) a wireless network (e.g., a cellular network). Some examples of a wireless communication device include, but are not limited to: a User Equipment device (UE) in a 3GPP network, a Machine Type Communication (MTC) device, and an Internet of Things (IOT) device. Such wireless communication devices may be, or may be integrated into, a mobile phone, smart phone, sensor device, meter, vehicle, household appliance, medical appliance, media player, camera, or any type of consumer electronic, for instance, but not limited to, a television, radio, lighting arrangement, tablet computer, laptop, or PC. The wireless communication device may be a portable, hand-held, computer-comprised, or vehicle-mounted mobile device, enabled to communicate voice and/or data via a wireless connection.

Network Node: As used herein, a "network node" is any node that is either part of the RAN or the core network of a cellular communications network/system.

Transmission/Reception Point (TRP): In some embodiments, a TRP may be either a network node, a radio head, a spatial relation, or a Transmission Configuration Indicator (TCI) state. A TRP may be represented by a spatial relation or a TCI state in some embodiments. In some embodiments, a TRP may be using multiple TCI states. In some embodiments, a TRP may a part of the gNB transmitting and receiving radio signals to/from UE according to physical layer properties and parameters inherent to that element. In some embodiments, in Multiple TRP (multi-TRP) operation, a serving cell can schedule UE from two TRPs, providing better Physical Downlink Shared Channel (PDSCH) coverage, reliability and/or data rates. There are two different operation modes for multi-TRP: single Downlink Control Information (DCI) and multi-DCI. For both modes, control of uplink and downlink operation is done by both physical layer and Medium Access Control (MAC). In single-DCI mode, UE is scheduled by the same DCI for both TRPs and in multi-DCI mode, UE is scheduled by independent DCIs from each TRP.

FIG. 1 illustrates one example of a cellular communications system 100 in which embodiments of the present disclosure may be implemented. In the embodiments described herein, the cellular communications system 100 is a 5G system (5GS) or 6G system (6GS) including a Next Generation RAN (NG-RAN) and a 5G Core (5GC) or a 6G Core (6GC). In this example, the RAN includes base stations 102-1 and 102-2, which in the 5GS include NR base stations (gNBs) and optionally next generation eNBs (ng-eNBs) (e.g., LTE RAN nodes connected to the 5GC) and in the EPS include eNBs, or any other suitable base station, controlling corresponding (macro) cells 104-1 and 104-2. The base stations 102-1 and 102-2 are generally referred to herein collectively as base stations 102 and individually as base station 102. Likewise, the (macro) cells 104-1 and 104-2 are generally referred to herein collectively as (macro) cells 104 and individually as (macro) cell 104. The RAN may also include a number of low power nodes 106-1 through 106-4 controlling corresponding small cells 108-1 through 108-4. The low power nodes 106-1 through 106-4 can be small base stations (such as pico or femto base stations) or RRHs, or the like. Notably, while not illustrated, one or more of the small cells 108-1 through 108-4 may alternatively be provided by the base stations 102. The low power nodes 106-1 through 106-4 are generally referred to herein collectively as low power nodes 106 and individually as low power node 106. Likewise, the small cells 108-1 through 108-4 are generally referred to herein collectively as small cells 108 and individually as small cell 108. The cellular communications system 100 also includes a core network 110, which in the 5G System (5GS) is referred to as the 5GC. The base stations 102 (and optionally the low power nodes 106) are connected to the core network 110.

The base stations 102 and the low power nodes 106 provide service to wireless communication devices 112-1 through 112-5 in the corresponding cells 104 and 108. The wireless communication devices 112-1 through 112-5 are generally referred to herein collectively as wireless communication devices 112 and individually as wireless communication device 112. In the following description, the wireless communication devices 112 are oftentimes UEs, but the present disclosure is not limited thereto.

In some embodiments, a set Transmission Points (TPs) is a set of geographically co-located transmit antennas (e.g., an antenna array (with one or more antenna elements)) for one cell, part of one cell or one Positioning Reference Signal (PRS)—only TP. TPs can include base station (eNB) antennas, Remote Radio Heads (RRHs), a remote antenna of a base station, an antenna of a PRS-only TP, etc. One cell can be formed by one or multiple TPs. For a homogeneous deployment, each TP may correspond to one cell.

In some embodiments, a set of TRPs is a set of geographically co-located antennas (e.g., an antenna array (with one or more antenna elements)) supporting TP and/or Reception Point (RP) functionality.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

In a typical communication system, most of the UEs does not have a radar built into them. Therefore, the current disclosure includes systems and methods to sense the environment of a UE at a macro level using communication signals alone. Specifically, methods are proposed to detect the landscape around the UE to answer the hypothesis questions such as whether the UE is on a street, or the UE is surrounded by a forested area, etc.

Detecting the landscape around the UE can have significant benefits. In future 6G systems, it is very important for the BS to understand the UE's environment to tailor the signal for it to counter the extreme propagation condition described above. Knowing the landscape helps the UE to predict the likelihood of the handover and can aid in mobility management. It can also enhance the digital twin representation of the UE environment in a 6G network for improved inference and action by the network infrastructure to support the KPI requirements.

There exist several works on environment sensing using dedicated sensor and radars in UEs. In these works, UE (typically an autonomous vehicle), uses the Synthetic Aperture Radar (SAR) to illuminate the environment and from the return signal an inference about the environment is made. For example, in some references, the authors use SAR to sense parking lots near the vicinity of the UE. Similarly, in other references, authors use sensing infrastructure on the road together with the wireless communication for environment sensing. These approaches are not feasible for majority of the UEs in the network since they do not have the radars in them. Another approach to the landscape sensing includes the estimation of the position using GPS sensor or using the dedicated positioning reference signal to localize the UE and use the Geographic Information System (GIS) with high resolution maps to draw inference on the landscape.

In all the above discussed landscape sensing methods, UEs need external support from one or more entities such as sensors, radars, dedicated signaling, GIS servers, etc. This limits the applicability of these methods for all UEs under all scenarios. To the best of our knowledge, this is the first work which proposes a method where the BSs can infer about the UE's landscape without the need for any new sensor or radar infrastructure requirements. In some embodiments of the current disclosure, an AI based method is provided which employs a computationally efficient feature engineering and leverages the dense deployment of the future network to employ a distributed method to arrive at the inference on the landscape.

In some embodiments of the current disclosure, an Artificial Intelligence (AI) or Machine Learning (ML) based method is proposed which employs a computationally efficient feature engineering and leverages the dense deployment of the future network to employ a distributed method to arrive at the inference on the landscape type at the UE location.

In some embodiments of the current disclosure, a novel system architecture is proposed for integrating the proposed AI based method into the wireless system.

The feature engineering for such an AI detector employs few strong path-gains (e.g., RSRPs) from multiple BSs which will yield small dimension input features and will reduce the computational complexity so that it can be implemented on an embedded BS hardware. Since the features needs to be collected from multiple base-stations, the smaller the number of feature elements, minimum will be the network overhead (BS-2-BS) communication. In some ways, this can be an advantage, as it reduces the signaling need between BSs, or between BS and cloud server, or between UE and BS.

A system design is proposed for obtaining the path-gains for the UE-BSs links at the serving cell without any BS-BS communication. Here, some embodiments propose to configure the UE for periodic measurement reporting, through radio resource control (RRC) signaling, the UE will report the neighbor cell measurements at regular intervals which contains RSRPs (path-gains) to the neighbor cells and can be used for landscape detection.

Figure 2:
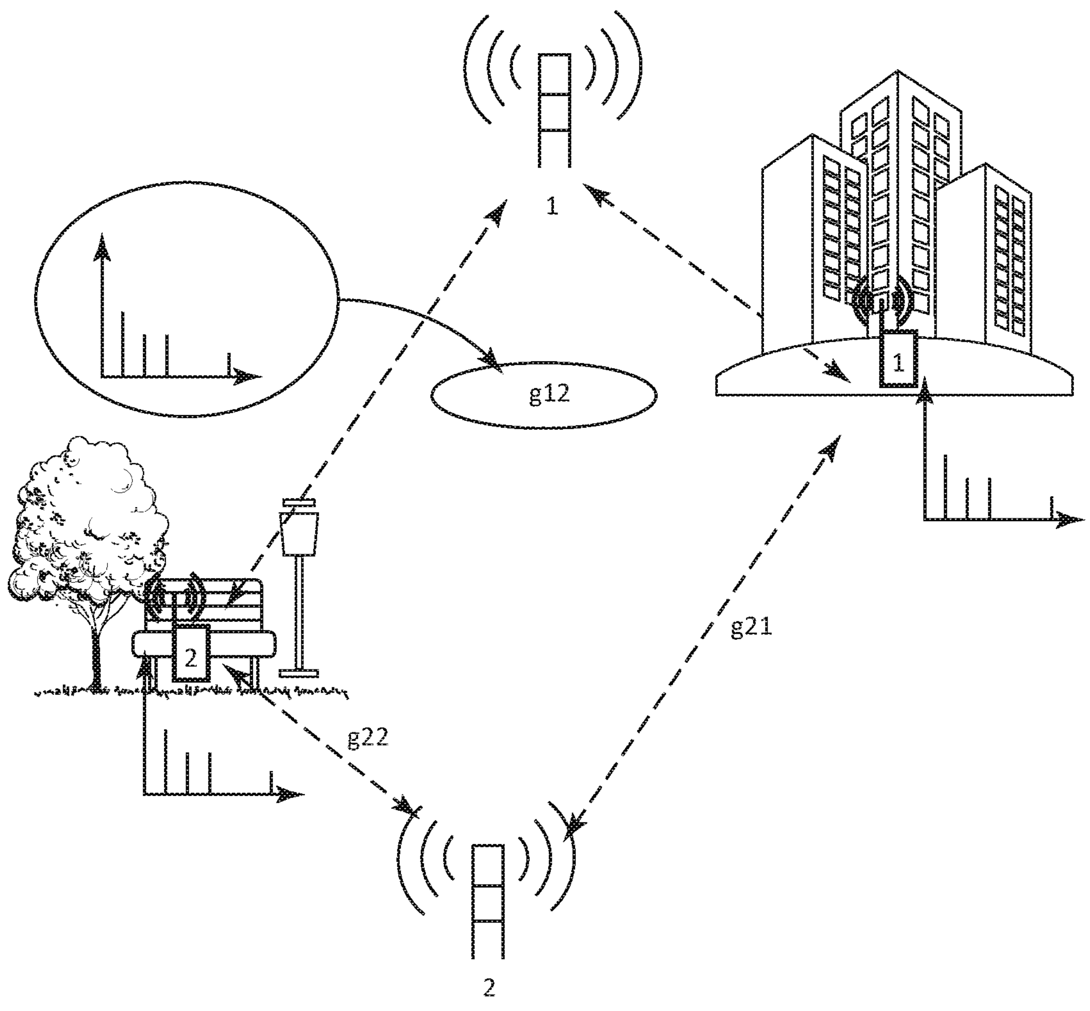
FIG. 2 illustrates the UEs in forest and urban landscape and two BSs are serving them, according to some embodiments of the present disclosure.

For example, a typical deployment of the UEs in a metro city like London can be considered, whose landscape could include several geographical characteristics such as buildings, forests, streets, barren-landscapes, sea, etc. An illustration of such a deployment is as shown in the FIG. 2. FIG. 2 illustrates the UEs in forest and urban landscape and two BSs are serving them. By harvesting the path-gains from multiple BSs, the landscape around the UE can be detected. Here two UEs are shown, UE-1 is in an urban canyon and UE-2 in a forested area. The uplink (UL) impulse response having rich multi-path profiles carries information regarding the UE's environment. Harvesting the uplink impulse response from multiple base-stations can provide higher diversity due to the different geometric perspectives to the observations. For example, in FIG. 2, the multi-path profiles from UE-1 to BS-1 and BS-2 will have a particular signature which will be different from multi-path signatures of UE-2 to BS-1 and BS-2. If the BSs co-ordinate by transferring the multi-path profile of the UE to the serving BS (BS to BS communication is possible using 3GPP X2 interface), then a better estimate about the landscape can be made.

Figure 3:
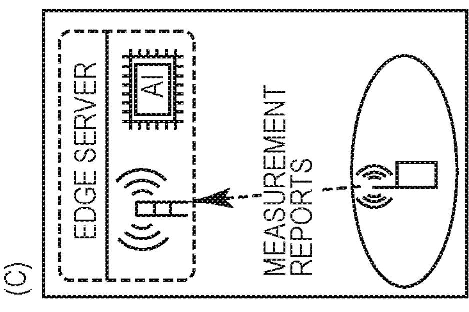
FIG. 3 illustrates an exemplary system architecture, according to some embodiments of the present disclosure.
Figure 3:
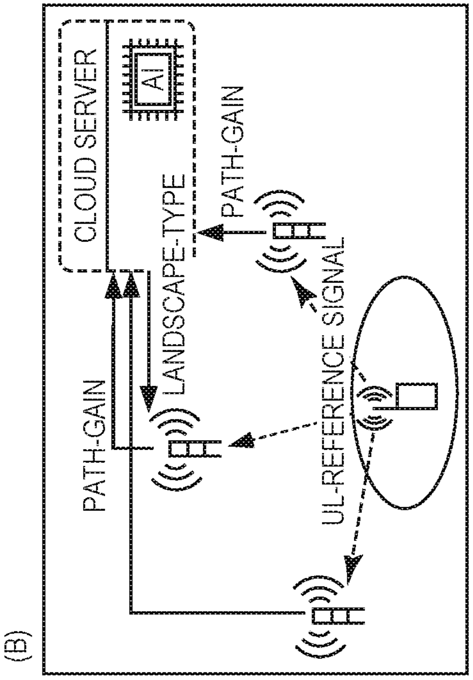
Figure 3:
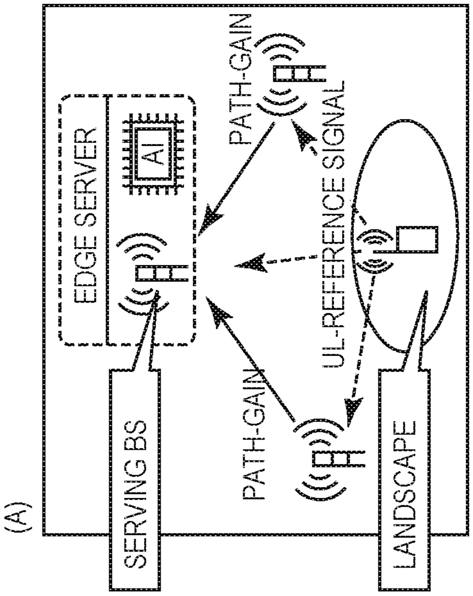

There are several challenges with such a system design. Firstly, the exchange of information between non-serving BSs to the serving BS for aggregating the multi path-profiles of a UE requires significant communication. Secondly, applying AI/ML methods on such large-dimension input features will be computationally expensive especially for an embedded BS hardware. Thirdly, it is not possible to obtain the multipath uplink Channel Impulse Response (CIR) accurately for BS which are far-away since the uplink transmission power is limited, to counter these challenges, the multi-path profile of the link is represented using a single large-scale channel statistic such as path-gain, a representation of this in the form of Reference Signal Reference Power (RSRP) can also be used. Note: RSRP and path-gains are sometimes used interchangeably used in this document. However, the current disclosure is not limited thereto. Any other sufficient measurement or combination of measurements can be used. Since each BS will transfer only path-gain instead of entire multi-path profile, this reduces the input feature dimension for the estimation algorithm and reduces the overhead in the distributed sensing setup (see FIG. 2). The system architecture for the proposed method is illustrated in FIG. 3. Each path-gain gives a different geometric perspective to the UE environment (see FIG. 2). Some embodiments disclosed herein learn the mapping between multiple path-gains towards classification. In some embodiments, learning includes association between various statistical parameters of the path-gain towards environment classification. For example, a typical urban environment may have many cells with small Inter-Site-Distance (ISD), where the path-gains between the UE and multiple BSs will have large variability with many stronger path-gains compared to a rural environment, where there is one strong path-gain with maybe many other low path-gain samples.

As shown in FIG. 3(*b*), one can also have an architecture where instead of transferring the path-gains to the EDGE server on the serving BS (as illustrated in FIG. 3(*a*)), it can also be aggregated in a central cloud server which will make the inference on the Landscape using the AI method and transfer it back to the serving BS so that it can take necessary network action.

This system design can be further improved by limiting the path-gain only to top N strongest links. This will reduce the communication between BSs or BS and the central cloud server. Later the analysis on the detector performance with N is shown.

The path-gains between the links, can also be obtained at the serving cell without any BS-BS communication. For example, as shown in FIG. 3(*c*), by configuring the UE for periodic measurement reporting, through radio resource control (RRC) signaling, the UE will report the neighbor cell measurements at regular intervals which contains RSRPs (path-gains) to the neighbor cells and can be used for landscape detection.

In the following, a method for representing the path-gain in uplink is described (required for system design shown in FIG. 3(*a, b*)) and in downlink (required for system design shown in FIG. 3(*c*)) for typical cellular systems. In the UL, the BSs in the network first agree on the sounding reference signal (SRS) configurations, then each BS measures RSRP on the SRS block for the UE to represent path-gains and communicate it to the serving BS. In the system design shown in FIG. 3(*c*), UE will measure the RSRP of the serving and neighbor cells on the existing downlink broadcast beams such as synchronization beam and report to the serving BS through RRC measurement reporting protocol.

In some embodiments, the large-scale statistics of the uplink and downlink channels are typically reciprocal. If a channel is measured by a UE, the measurement needs to be reported back to the serving BS (e.g., as measurement report comprising of measurements on access beams or downlink reference signals (such as PRS) from collaborating BSs). In uplink, BSs can also measure path gains by using UL reference signals such SRS.

Consider a typical deployment with K BSs. A training set consisting of features and labels are first constructed by dropping the UEs at random positions at various landscapes and collecting the path-gains to various BSs and collating them into a set called training set. The I-th row of such a training set is given by:

$$T^{<l>} = \{S_N(\mathcal{F}^{<l>}), \mathcal{L}^{<l>}\}, \tag{1}$$

Where:

$$\mathcal{F}^{<l>} = \{g_1^{<l>}, g_2^{<l>}, \ldots, g_K^{<l>}\}, \tag{2}$$

$$\mathcal{L}^{<l>} = c \tag{3}$$

and $l \in \{1, \ldots, L\}$ denotes the l-th row of the training set and $c \in \mathcal{C}$, with $\mathcal{C}$ denoting the categories set consisting of landscape types such as street, forest, buildings, sea, etc. The function $S_N(\cdot)$ retains the dominant N paths while zeroing out the rest of the set, such that $$|S_N(\mathcal{F}^{<l>})| = N. \tag{4}$$

The $|\cdot|$ denotes the cardinality of the set.

The training set with appropriate features set design as discussed in the previous section is used to train a supervised AI agent for landscape estimation. Since the label belongs to a pre-defined set (called categories or landscape-types), the AI method should be a classification algorithm supervised or trained by this training set.

Though several AI methods are possible, in some embodiments, a random forest algorithm is used, since the method is robust against outliers and perform well for highly non-linear partition boundaries. In other embodiments, any suitable classification system can be used. In some embodiments, the classification system is at least one of a linear classifier, a quadratic classifier, a support vector machine, a kernel estimator, and a neural network. In the following, the random forest algorithm is discussed briefly.

Random Forest Algorithm

Figure 4:
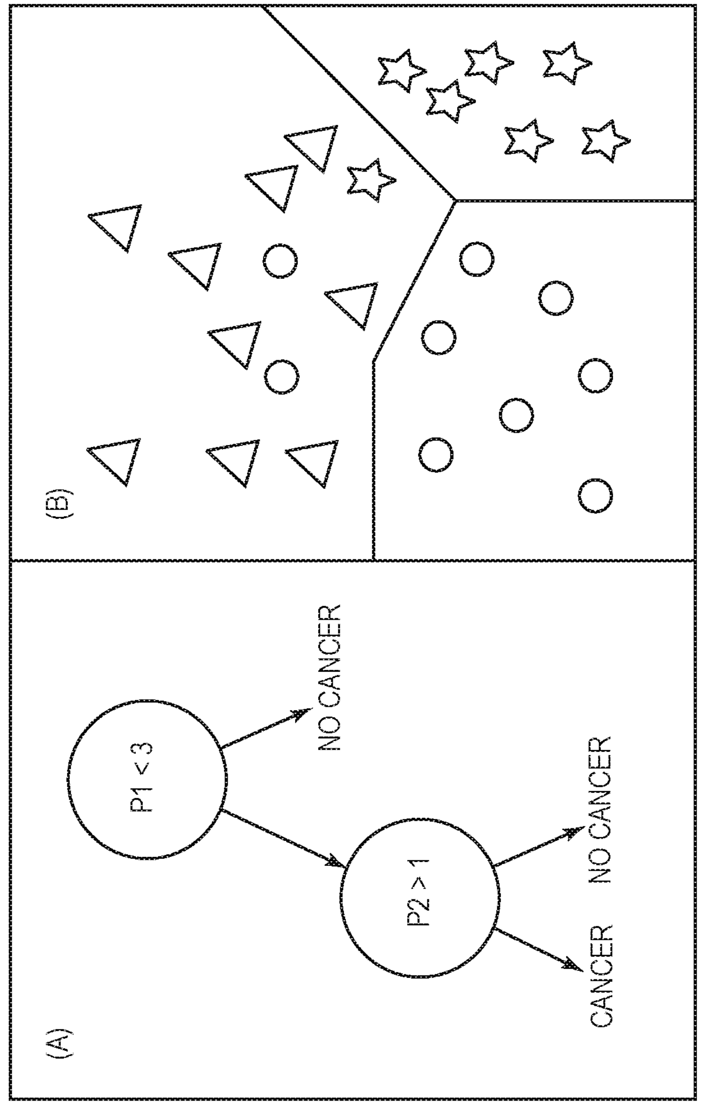
FIG. 4 illustrates a decision tree and partition diagram of a random forest classifier, according to some embodiments of the present disclosure.

Random forest is an ensemble learner built on decision trees. A decision tree is a tree like model with its nodes denoting a test on a feature and its branches denoting the consequence for a particular test outcome. FIG. 4 illustrates a decision tree and partition diagram of a random forest classifier. FIG. 4(*a*) denotes a toy example of a decision tree with tests on two features on a graph to arrive at the decision on cancer. As shown in FIG. 4(*b*), the class boundaries in the random forest yields better generalization and less over-fitting due to the averaging of results from many decision trees. Typically, the leaf-notes points to a class in a classification problem. An illustration of the decision-tree for a toy problem is shown in the FIG. 4(*a*). Each step partitions the training set, and the process is repeated in a recursive manner until all the elements in the set has the same target-class or there is no value in further partitioning. Practical classification problems have several features and typically need deep decision trees and they tend to over-fit the data resulting in poor performance on unseen data. To overcome this problem, ensemble classifier called random forest can be employed. Random forest algorithm average over multiple decision trees and is shown to generalize the model better. An illustration of the partition boundaries in a random forest classifier is shown in the FIG. 4(*b*). In the next section, an example network deployment and simulation settings for the random forest-based landscape detection algorithm are described.

Network Deployment and Simulation Configuration

Figure 5:
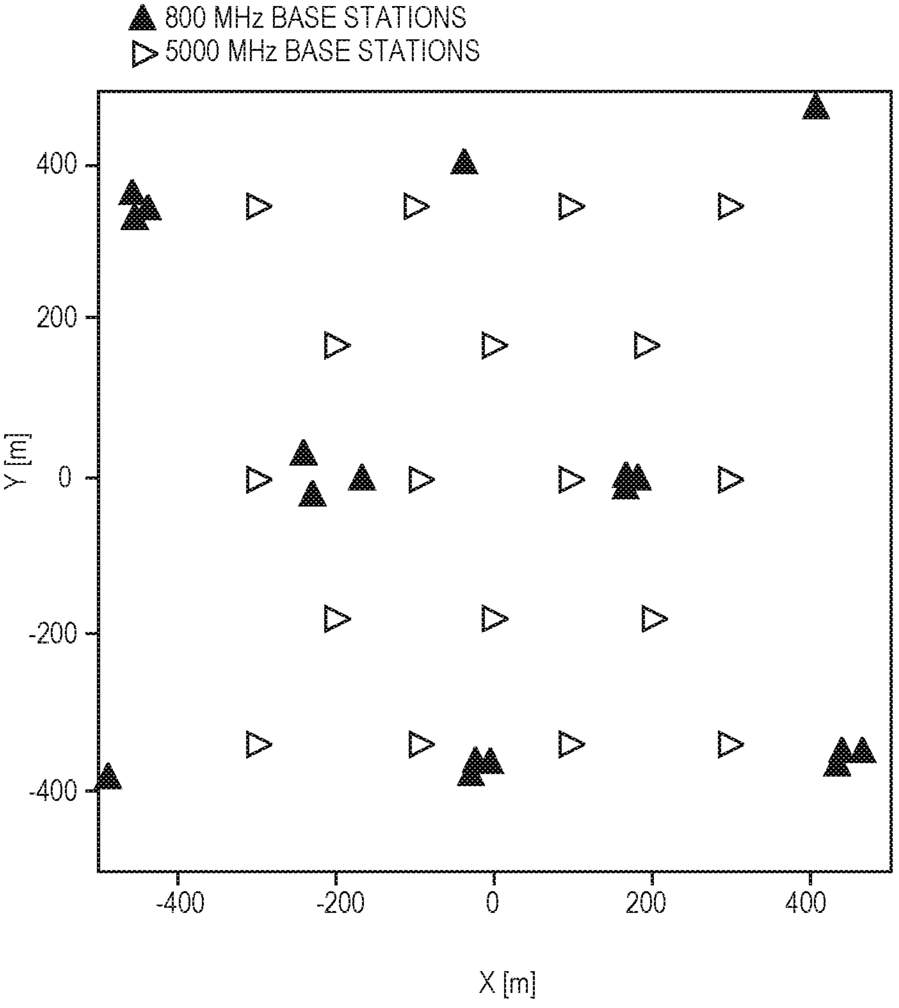
FIG. 5 illustrates the multi-carrier deployment having 800 MHz and 5000 MHz BSs covering 1 km×1 km section of central London, according to some embodiments of the present disclosure.
Figure 6A:
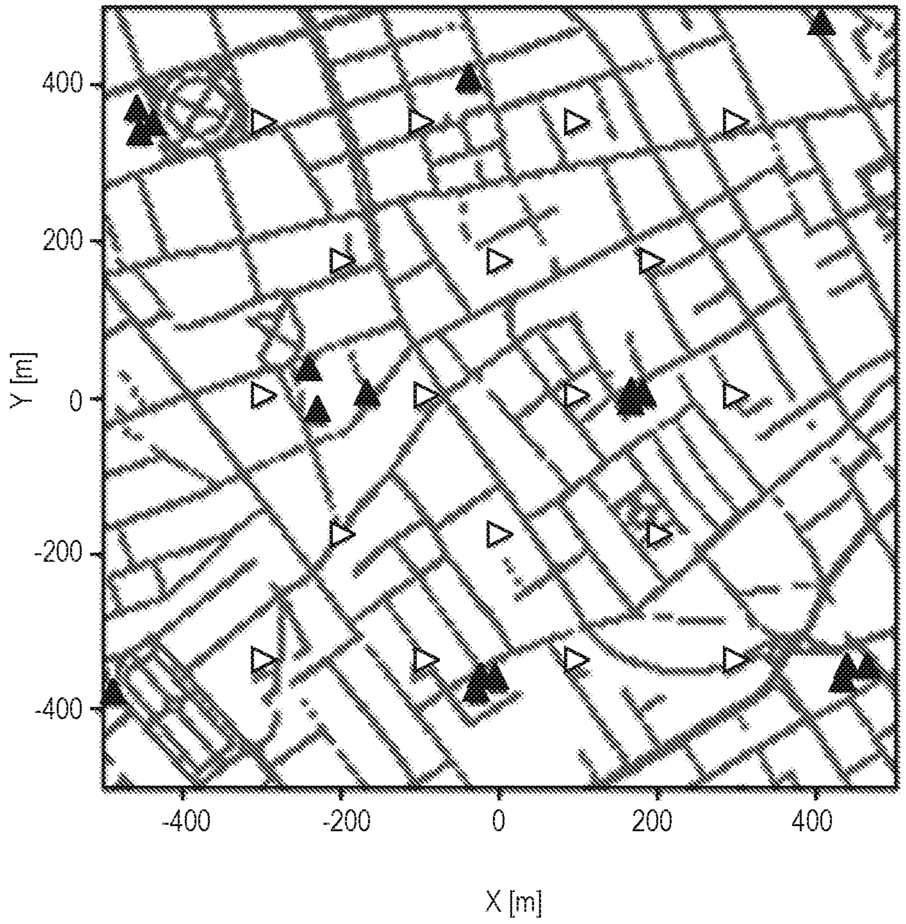
FIGS. 6A-6D illustrate four landscapes in the 1 km×1 km section of central London, according to some embodiments of the present disclosure.
Figure 6B:
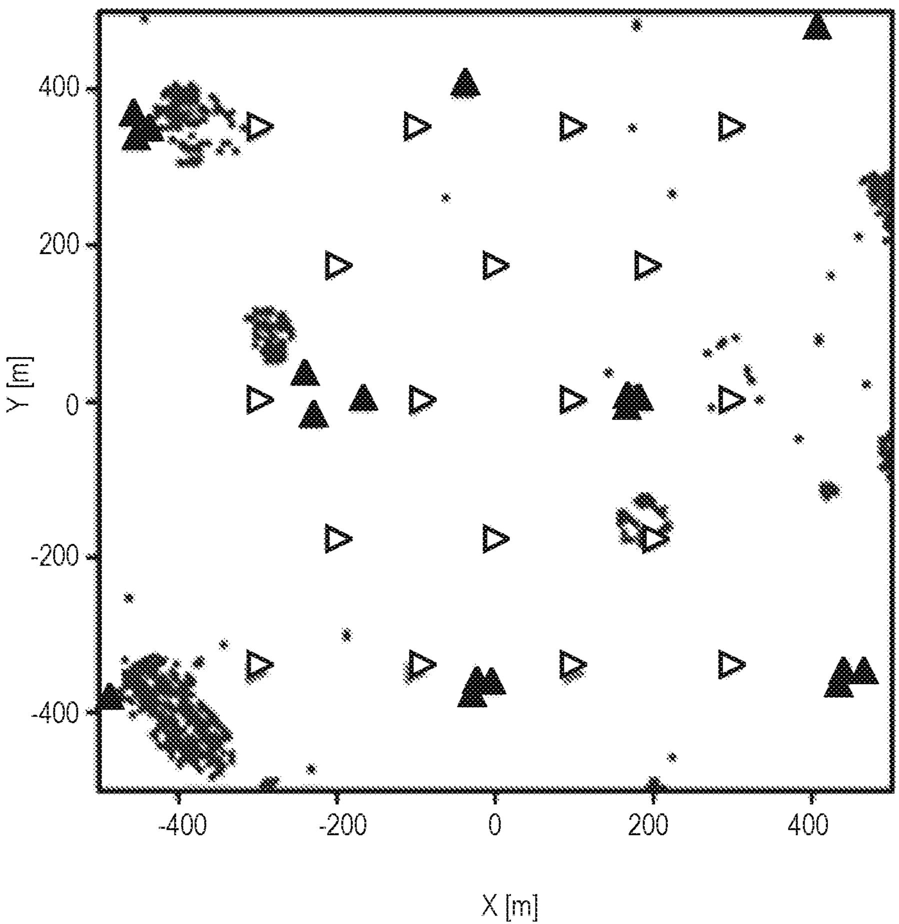
Figure 6C:
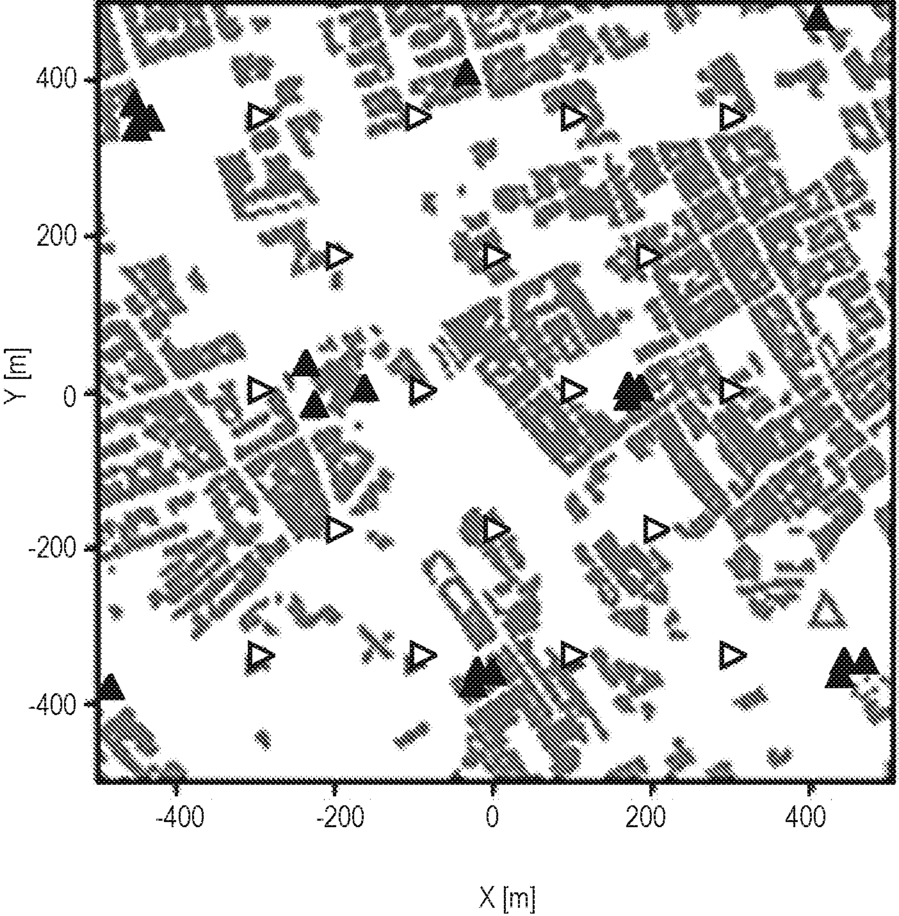
Figure 6D:
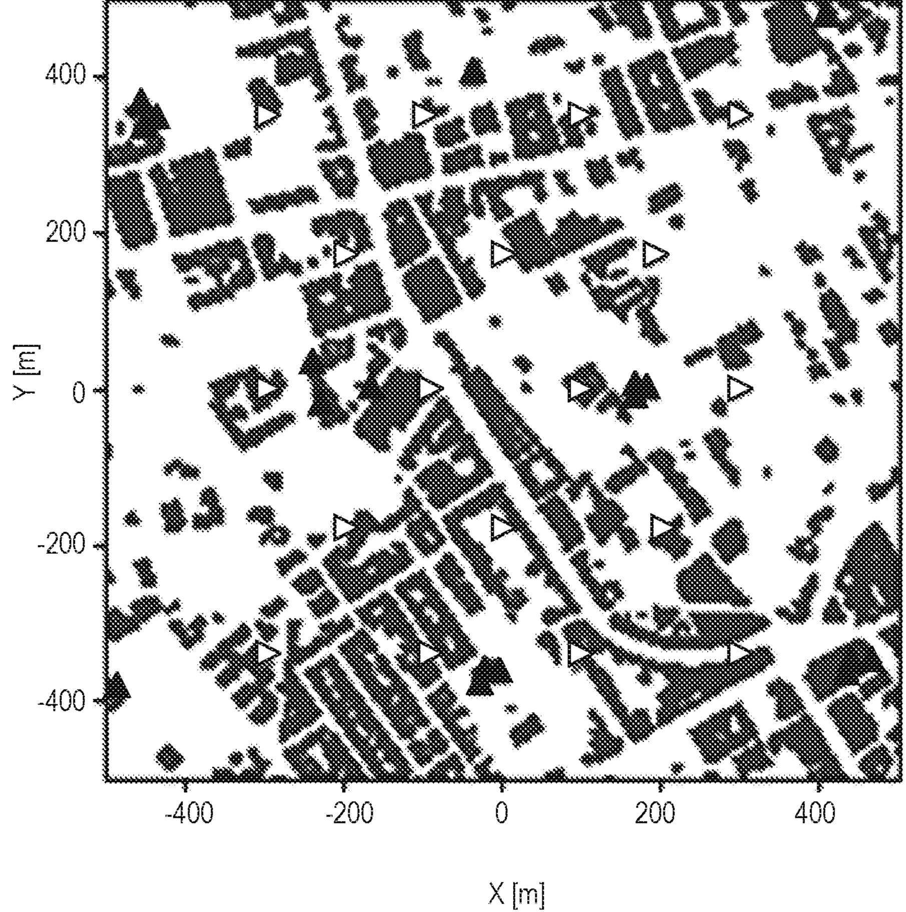

London city is used with its rich urban environment for accessing the landscape detection performance of the proposed method. A multi-carrier deployment of 1 km×1 km area of the central London is considered. The region is served by two frequency layers 800 MHz and 5000 MHz. These base stations (BS) are deployed as shown in the FIG. 5. FIG. 5 illustrates the multi-carrier deployment having 800 MHZ and 5000 MHz BSs covering 1 km×1 km section of central London.

The simulation deployment has K=20 base stations operating at 800 MHZ, and K=54 base stations (18 sites with 3 sectors) operating at 5000 MHZ. At high frequency the signal attenuation is higher and hence require many base stations to provide connectivity. There are several landscapes within the region of the Landon city that can be considered, FIGS. 6A-6D show forest, street, buildings (8-20 [m]) and buildings (20-40 [m]). FIGS. 6A-6D illustrate four landscapes in the 1 km×1 km section of central London. FIGS. 6A, 6B, 6C, and 6D denote the street, forest, building (8-20 [m] height) and building (20-40 [m] height), respectively.

As explained above, the multi-path profiles and path-gains experienced by the UE are influenced by the landscape the UE is in. A system simulation tool called Axcel is used which implements simplified ray-tracing propagation model called BEZT (BErg Zofia Thiessen) for arriving at the path-gains at various UE drops on the region having the deployment as shown in FIG. 5.

Results and Analysis

Binary Hypothesis

Detection of whether the UE is in a particular type of the landscape can be considered as a binary hypothesis problem. An example to these includes answers to the questions such as "Is the UE is on a street?", "Is UE surrounded by a forested region?", etc. Answers to these hypothesis questions can aid the network in taking appropriate actions to optimize performance. For example, detecting the UE on the street can aid in mobility actions such as handover (HO), detecting the UE in forest can trigger action to extend coverage, etc.

A system is considered where the labels are binarized to 0 and 1 depending on whether the UE is in a particular type of landscape, i.e., (3)

$$c = \begin{cases} 1, & \text{If } UE \text{ is in the landscape being detected,} \\ 0, & \text{Otherwise.} \end{cases} \tag{5}$$

Two types of landscapes, "Streets" and "Forests," are considered. A training set is constructed using a system simulation tool with the BEZT propagation model. A suit of training sets with distinct value of N, (refer to (4)) each having L=20000 rows is constructed, and each set is used to separately train AI agent using random forest algorithm to access its performance dependence on N. To assess the performance the trained AI agent is tested with a corresponding validation set which is also comprised of 20000 rows but is not seen by the AI agent before. In some embodiments, the performance is defined in terms of precision and recall score. These are defined as $$\text{precision} = \frac{tp}{tp + fp} \tag{6}$$

and $$\text{recall} = \frac{tp}{tp + fn} \tag{7}$$

where tp, fp and fn are the true-positive, false-positive, and false-negative values, respectively. Precision score denotes the accuracy of the alternate-hypothesis (i.e., c=1) and recall score denotes the ratio of alternate hypothesis detected correctly by the agent. The precision score is more important than the recall score in landscape sensing problem since the hypothesis of UE in a particular landscape will trigger network to take optimization action which can be catastrophic in case of a false alarm.

Figure 7A:
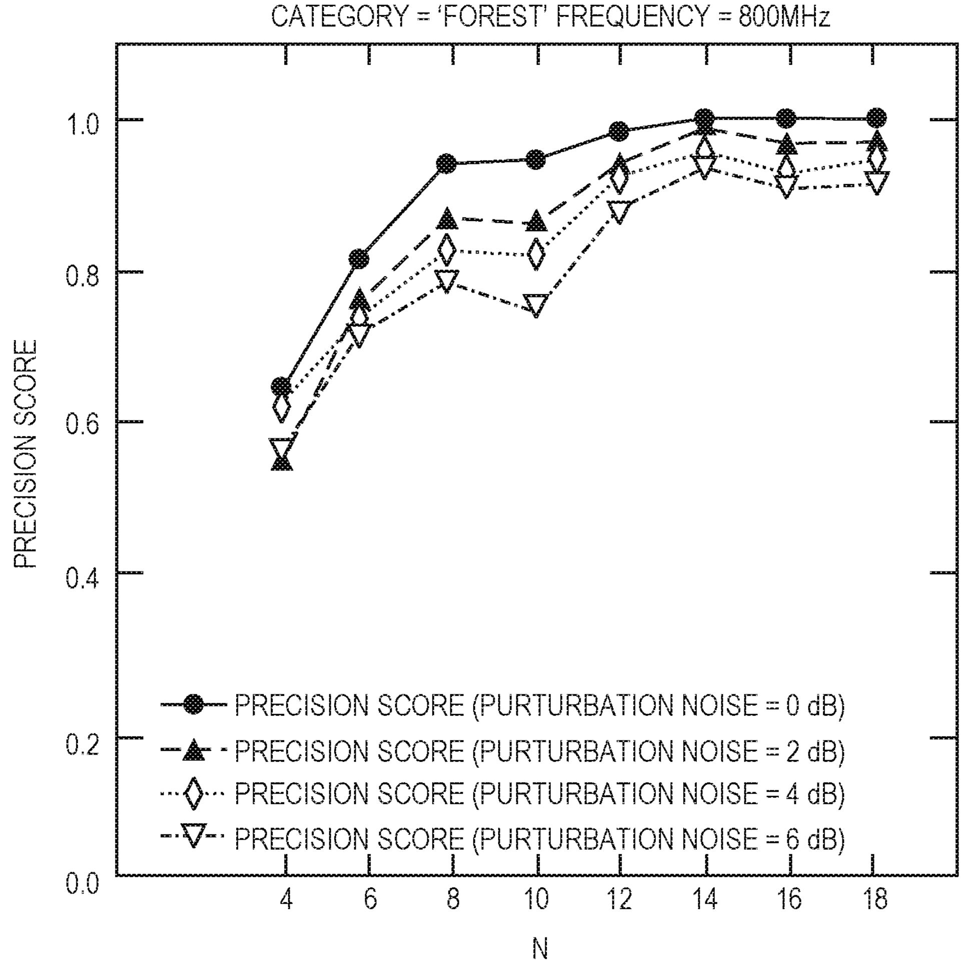
FIGS. 7A-7D illustrate an example performance of random-forest based AI method for 'Forest' and 'Street' landscape detection for a section of London city, according to some embodiments of the present disclosure.
Figure 7B:
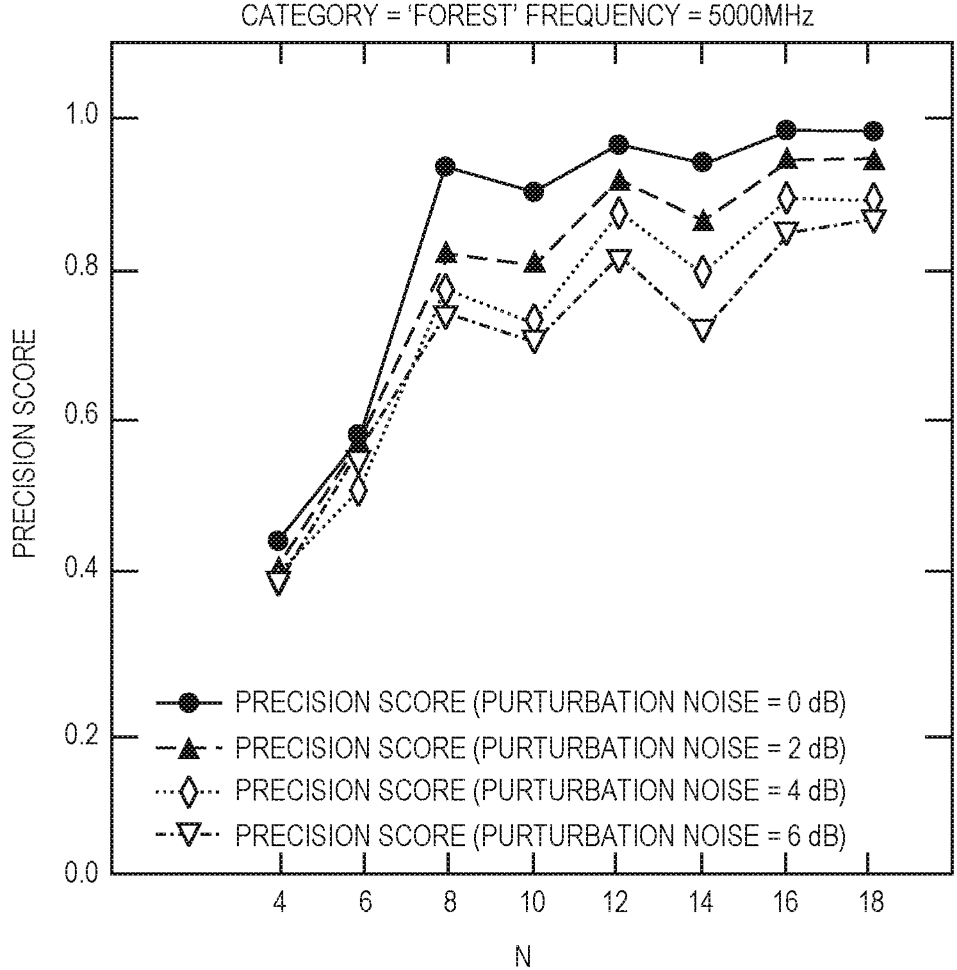
Figure 7C:
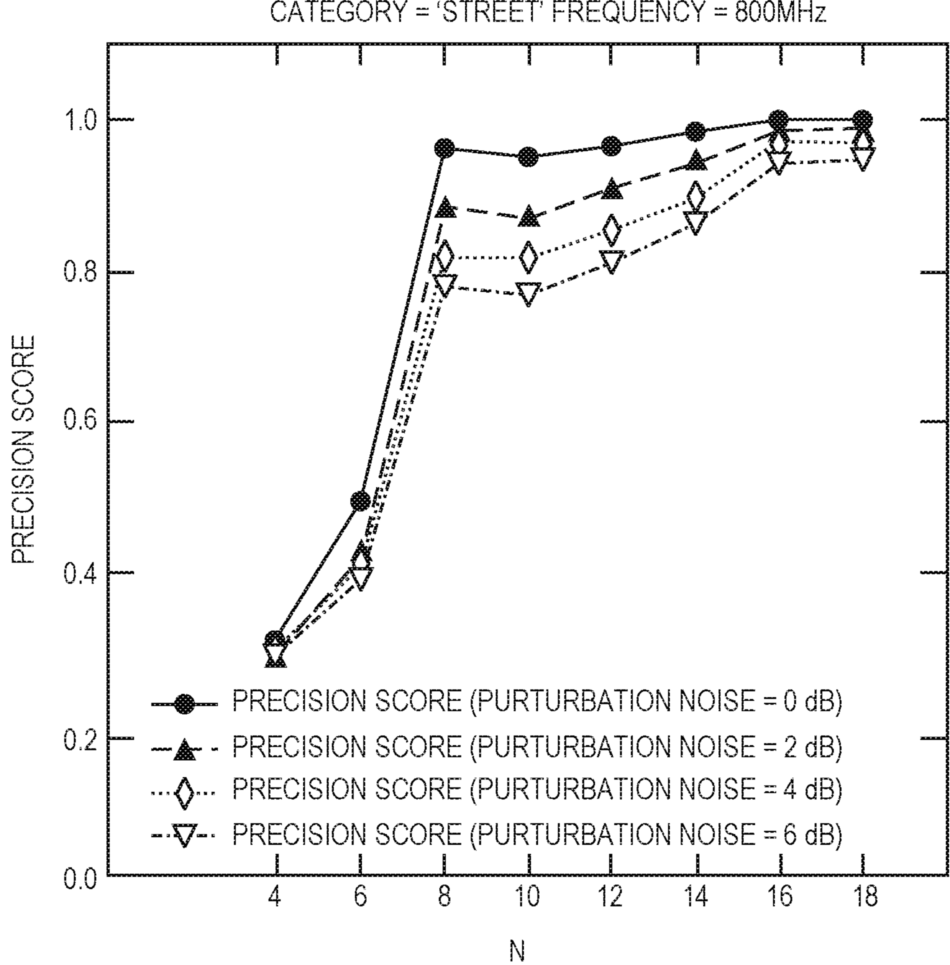
Figure 7D:
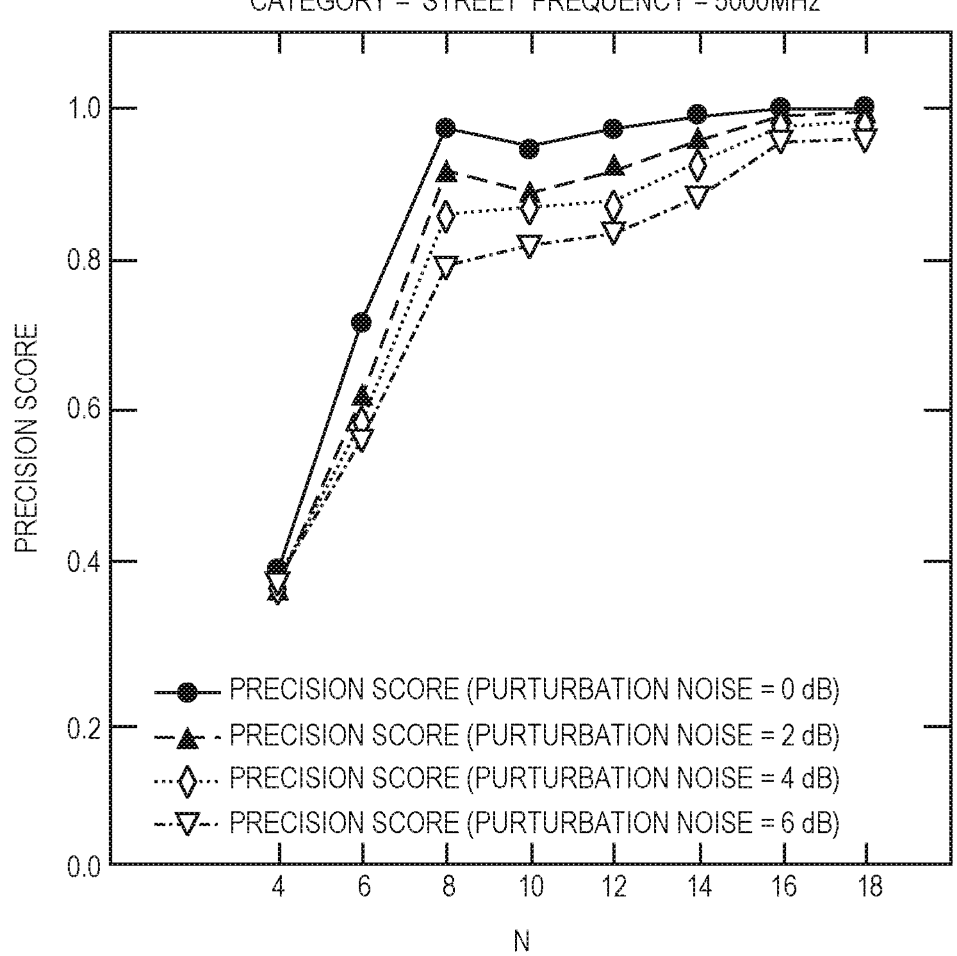

FIGS. 7A-7D illustrates an example performance of random-forest based AI method for 'Forest' and 'Street' landscape detection for a section of London city. The performance of the AI method for "forest" landscape detection is as shown in the FIG. 7A and FIG. 7B for 800 MHz and 5000 MHz frequencies respectively. As expected, the performance of the precision score improves with N, which is the number of strongest path-gains from diverse base-stations that is used by the AI agent in the hypothesis testing. The perturbation noise is added to the validation set to mimic the measurement uncertainty in the measurements. Typically, the agents are trained with the data from the measurement campaign. When the agent is deployed in the field for landscape detection, the measurements for the inference are derived from inexpensive RF transceivers in UEs or BSs (as explained in System Design Section), which may not be highly accurate. The performance of the agent should be robust to such uncertainty, from the results shown in the FIG. 7. Notice that the estimators have sufficient margin against the measurement uncertainty. The similar performance analysis for the "Street" landscape is shown in FIGS. 7C and 7D.

Multiple Hypothesis

Below the multiple hypothesis scenario is discussed, where the objective is to identify several landscape types together with the same feature set consisting of path-gain observations from multiple BSs. Landscape categories 11, 15, and 4 are considered denoting UE in street, building and barren landscapes. Landscape category 0 indicates that UE is in neither of the landscape categories 11, 15, and 4. The proportion of these categories (class-ratios) play a crucial role in the performance of the detector. The FIG. 8(*a*) shows the ratios of these regions in the section of the map of London city considered for the simulation.

Figure 8:
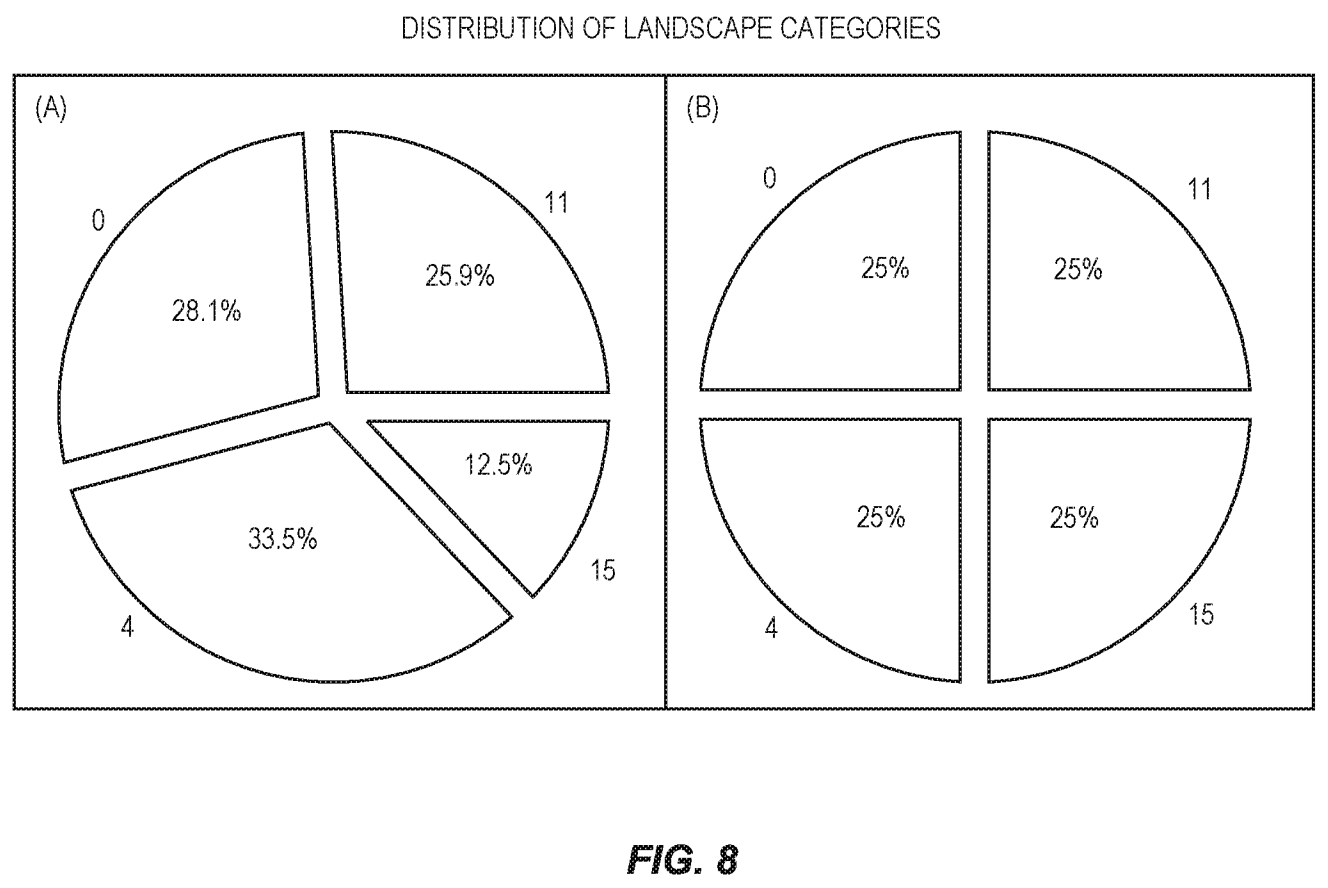
Figure 9A:
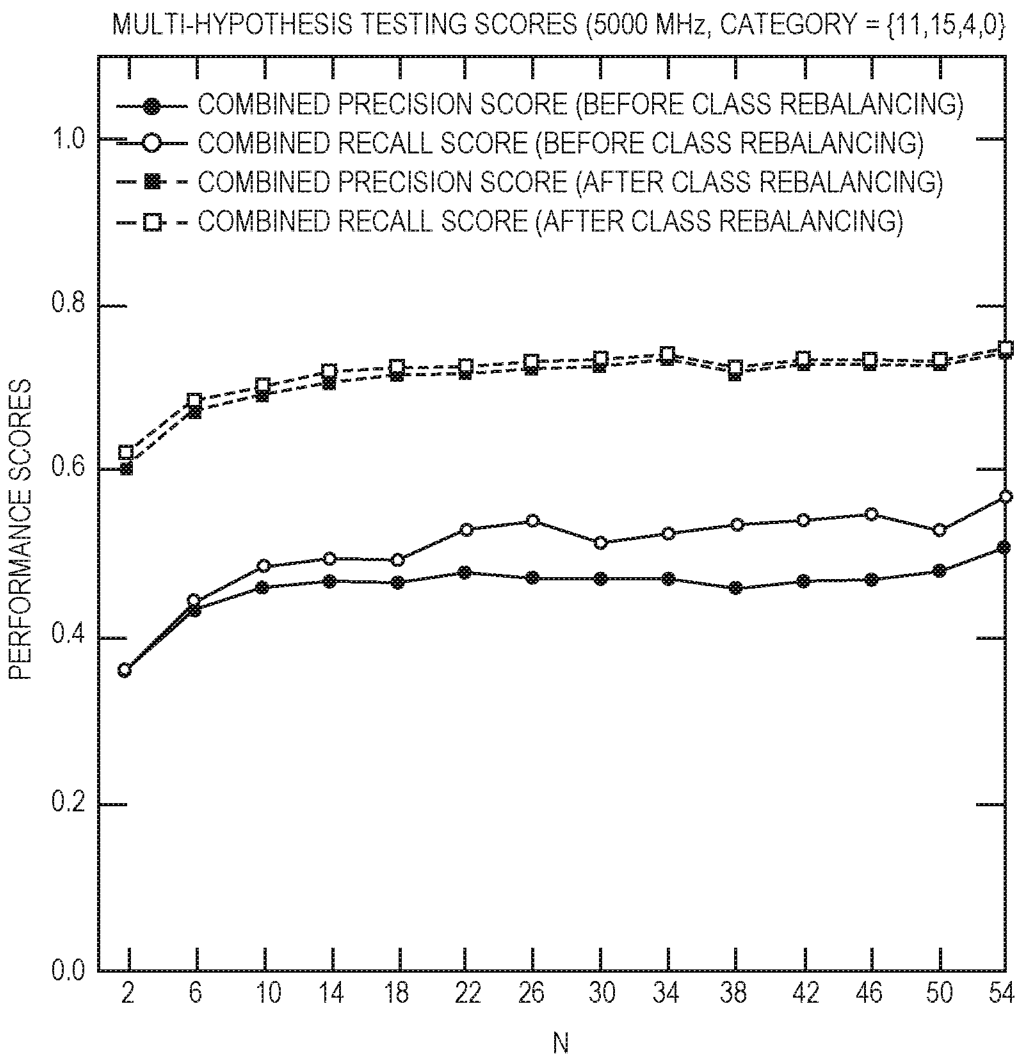
FIGS. 9A and 9B illustrate performance of the multi-hypothesis landscape sensing for 5000 MHz deployment Landscape category 11, 15, 4 and 0 is considered, according to some embodiments of the present disclosure.
Figure 9B:
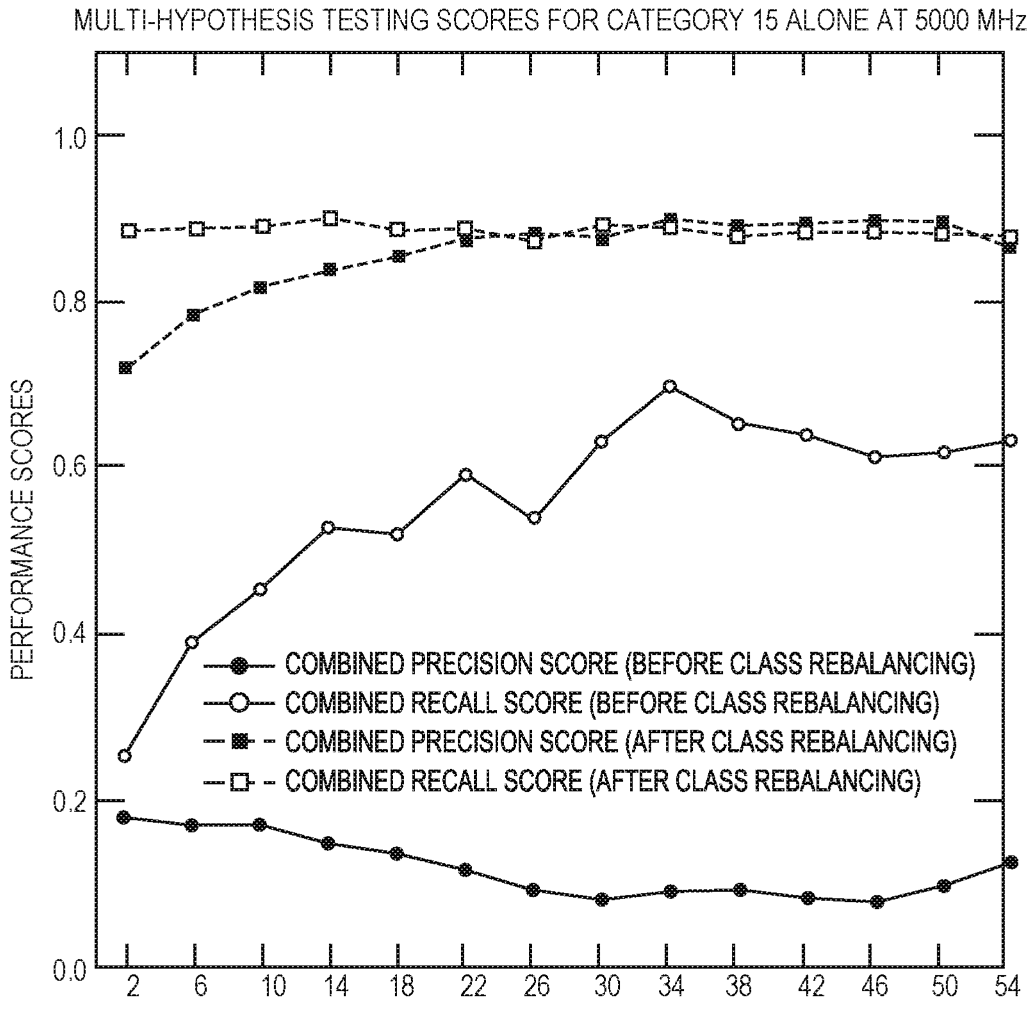

FIGS. 9A and 9B illustrate performance of the multi-hypothesis landscape sensing for 5000 MHz deployment (refer to Section Network Deployment and simulation configuration) Landscape category 11, 15, 4 and 0 is considered. Class re-balancing by re-sampling the training set can improve performance scores. The averaged performance scores from all the categories for the multi-class detector categories is shown in the solid line plots of FIG. 9A. The performance of the detector is improved by balancing the class ratio. This can be done by re-sampling the training set in such a way that results in equal ratios for all the classes as shown in FIG. 8(*b*). The average performance scores of the landscape category detection after class-ratio re-balancing is shown in the broken-line plots of FIG. 9A. The performance of the detector for the single class (street category alone) is shown in FIG. 9B. There is no noticeable improvement in the performance beyond (N=10), thus collaboration between 10 BSs in the dense deployment is sufficient to maximize detector performance.

Figure 10A:
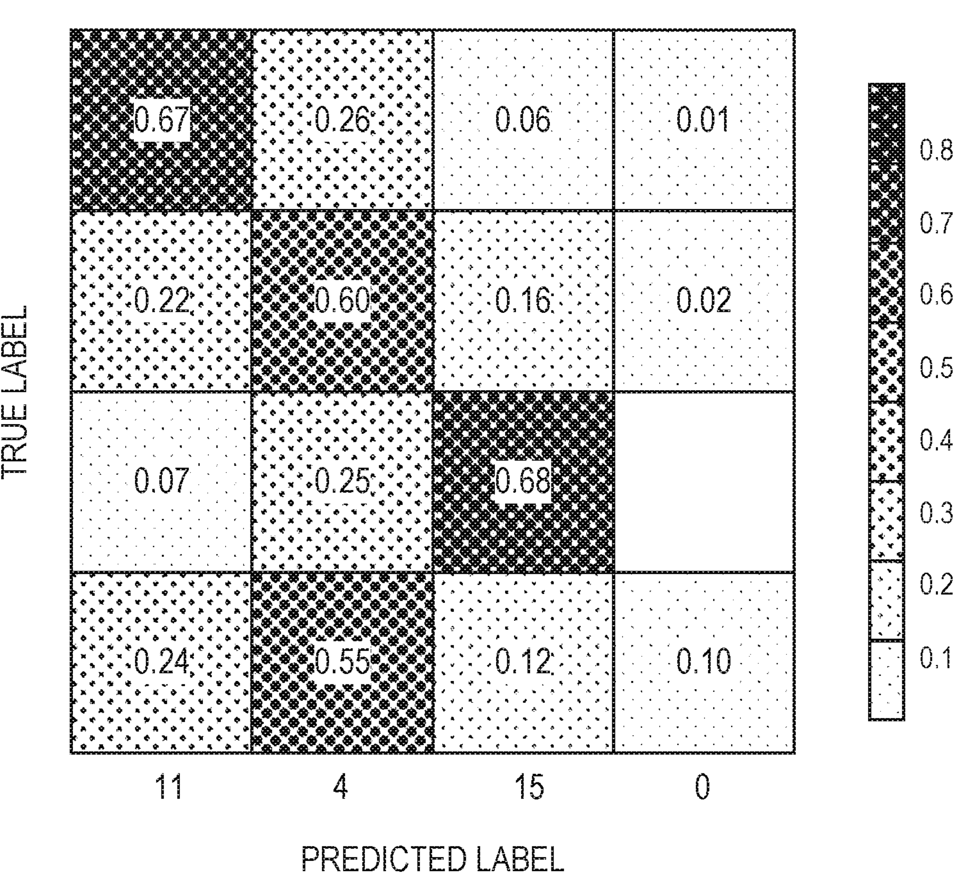
FIGS. 10A and 10B illustrate the confusion matrices for N=54 and Frequency=5000 MHZ AI model, according to some embodiments of the present disclosure.
Figure 10B:
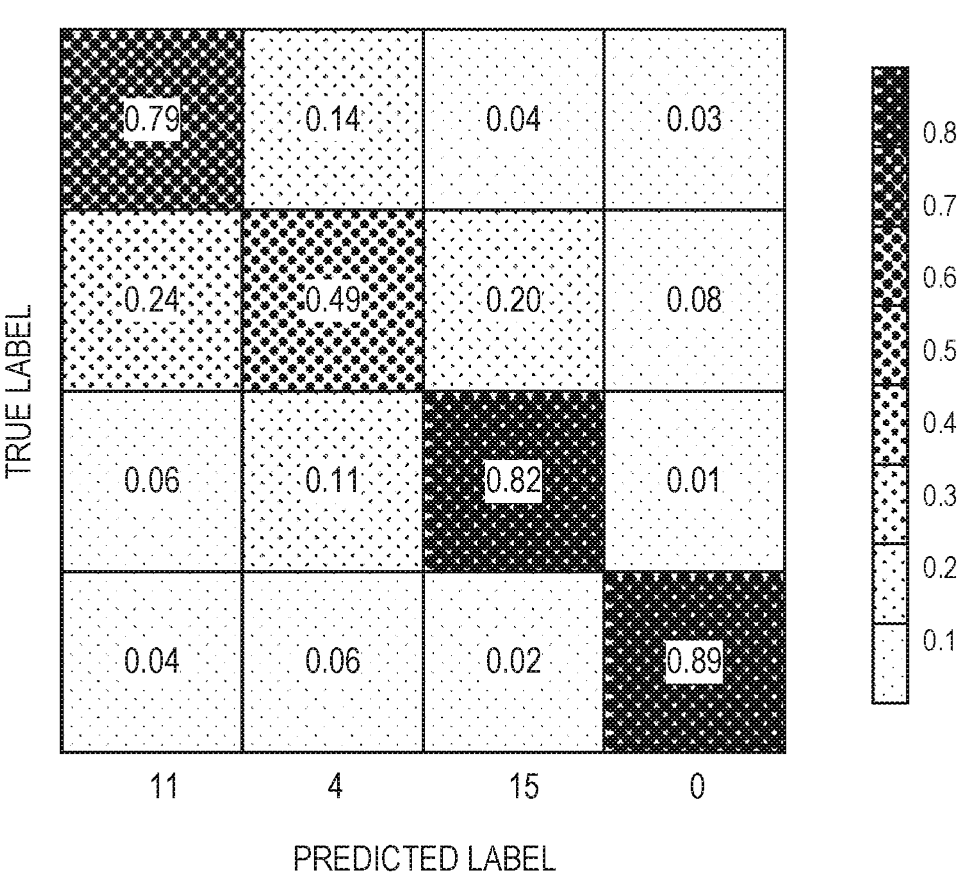
Figures 11, 12:
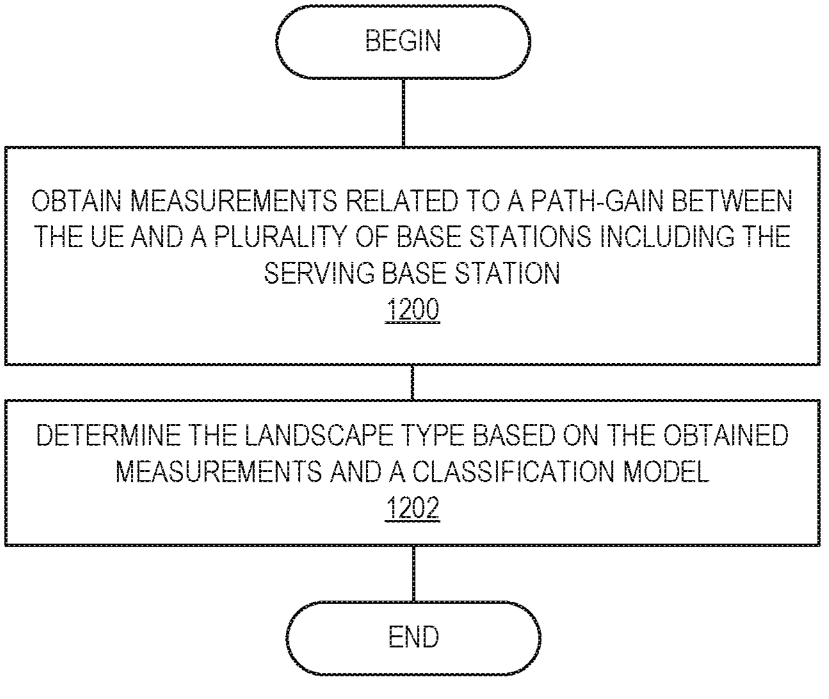
FIG. 11 illustrates a table for individual precision and recall scores for multi-hypothesis testing before and after class-ratio balancing, according to some embodiments of the present disclosure.
FIG. 12 illustrates a method performed by a BS for determining a landscape type surrounding a UE served by the BS, according to some embodiments of the present disclosure.

FIGS. 10A and 10B illustrate the confusion matrices for N=54 and Frequency=5000 MHZ AI model. FIG. 10A illustrates before class-ratio re-balancing. FIG. 10B illustrates after class-ratio re-balancing. The confusion matrices for before and after class-ratio re-balancing for N=54 case is as shown in the FIG. 10A and FIG. 10B respectively. The individual precision and recall scores computed from the confusion matrices by using (6) and (7) before and after class-ratio re-balancing is shown in FIG. 11. FIG. 11 illustrates a table for individual precision and recall scores for multi-hypothesis testing before and after class-ratio balancing. Notice that after class-ratio re-balancing so that all categories are of equal ratio as shown in FIG. 8(*b*), the average performance in terms of precision and recall scores has improved, however, the performance of some of the dominant landscape classes such as "barren land" has slightly deteriorated. Based on the application the class-ratios can be controlled in the training set to achieve the right trade-off in the multi-class detector's performance.

CONCLUSIONS

Sensing the landscape around the UE can aid the network in taking appropriate actions to optimize performance. UEs fitted with radars can enable this, however, in future network only a small fraction of UEs will have this capability. An AI based detector at the edge, which exploits the dense deployment of the future networks to arrive at the inference on the landscape sensing is promising. The feature engineering for such an AI detector to employ few strong path-gains from multiple BSs will yield small dimension input features and will reduce the computational complexity so that it can be implemented on an embedded BS hardware with minimum network overhead.

Results in FIGS. 7A-7D show that the proposed algorithm yields precision scores of greater than 95% for street and forest landscape. Perturbation analyses indicate that the proposed AI agent is robust to measurement uncertainty. Results from multi-hypothesis tests indicates that the performance of the detector depends on the class-ratios and can be improved by class-ratio re-balancing as shown in FIGS. 9A and 9B. However, this process can slightly deteriorate performance of dominant landscape classes as shown in FIG. 11. Based on the application the class-ratios can be controlled in the training set to achieve the right trade-off in the multi-class detector's performance.

Based on the above discussions and embodiments, some embodiments might include a combination of:

An AI detector method which employs a computationally efficient feature engineering and leverages the dense deployment of the future network to employ a distributed method to arrive at the inference on the landscape type at the UE location.

A new system architecture for integrating the proposed AI based method for landscape sensing into the wireless cellular systems (Refer to FIGS. 3(*a*)(*b*) and (*c*)). In FIG. 3(*a*), all BSs transfer the path-gains computed from the uplink reference signal to the serving BS. In some embodiments, the serving BS uses AI to infer the landscape. In FIG. 3(*b*), all BSs transfer the path-gains computed from the uplink reference signal to a centralized server (e.g., a cloud server). In some embodiments, the centralized service runs an AI method as described herein to infer the landscape type. In some embodiments, the inference (e.g., determination) is transferred to the serving BS. In FIG. 3(*c*), the BS configures the UE for periodic measurement reports using e.g., Radio Resource Control (RRC) signaling. From the measurement report, path-gains for N strong BSs are identified. In some embodiments, an AI method as described herein is employed on the edge to infer the landscape type.

A method where existing RRC signaling for handovers and other mobility functions called measurement reporting is employed for landscape sensing. Here the UE is configured to report the neighbor cell measurements through RRC signaling, these reports contain RSRPs (path-gains) to the neighbor cells and can be used for landscape detection using the systems and methods discussed above.

The feature engineering for the proposed AI detector in the systems and methods discussed above, with few strong path-gains (e.g., RSRPs) from multiple BSs which will yield small dimension input features and will reduce the computational complexity so that it can be implemented on an embedded BS hardware.

A method for perturbation analyses in the context of landscape sensing by altering the validation input set with a perturbation noise to assess the AI detector's robustness to measurement uncertainty.

A method to enhance the performance of the multi-hypothesis detection by re-sampling and class-ratio balancing in the context of landscape sensing.

All the claims are validated with a random-forest based AI method to show the benefits in the landscape detection. The results for the proposed methods when applied to practical environments such as London city scenario yields a precision score of more than 95 percent (refer to FIGS. 7A-7D). Perturbation analyses indicate that the proposed AI agent is robust to measurement uncertainty. Results from multi-hypothesis tests indicate that the performance of the detector depends on the class-ratios and can be improved by class-ratio re-balancing as shown in FIGS. 9A and 9B. However, this process can slightly deteriorate performance of dominant landscape classes as shown in FIG. 11. Based on the application the class-ratios can be controlled in the training set to achieve the right trade-off in the multi-class detector's performance.

One can also have an architecture where instead of transferring the path-gains to the EDGE server (on the serving BS), path-gains from multiple BS can also be aggregated in a central cloud server which will make the inference on the Landscape using the AI method and transfer it back to the serving base-station so that it can take necessary network action in-terms of HandOver, beamforming, carrier-selection, etc.

FIG. 12 illustrates a method performed by a BS for determining a landscape type surrounding a UE served by the BS, according to some embodiments of the current disclosure. The method includes obtaining measurements related to a path-gain between the UE and a plurality of base stations including the serving base station (step 1200); and determining the landscape type based on the obtained measurements and a classification model (step 1202).

Figure 13:
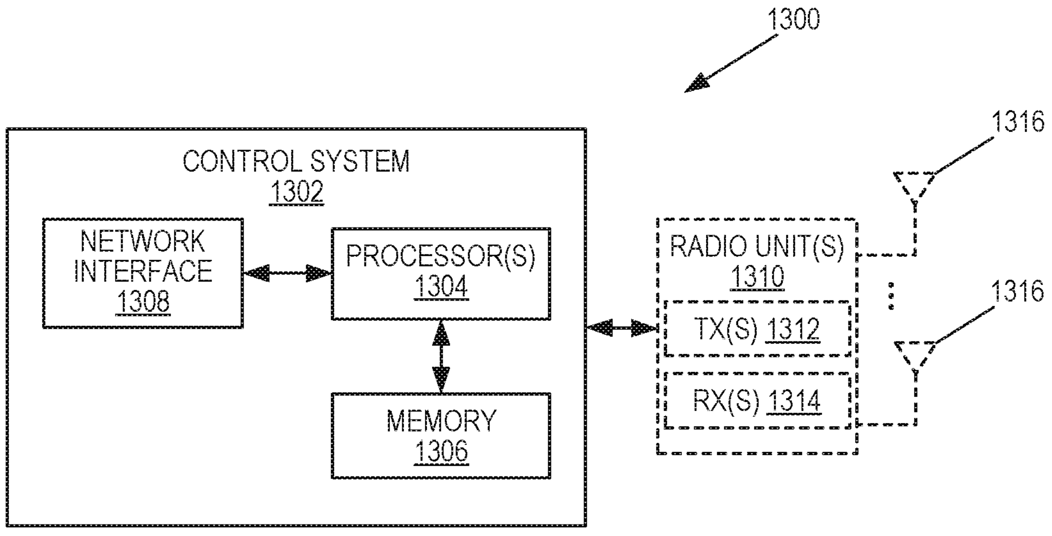
FIG. 13 is a schematic block diagram of a radio access node according to some embodiments of the present disclosure.

FIG. 13 is a schematic block diagram of a radio access node 1300 according to some embodiments of the present disclosure. Optional features are represented by dashed boxes. The radio access node 1300 may be, for example, a base station 1302 or 1306 or a network node that implements all or part of the functionality of the base station 1302 or gNB described herein. As illustrated, the radio access node 1300 includes a control system 1302 that includes one or more processors 1304 (e.g., Central Processing Units (CPUs), Application Specific Integrated Circuits (ASICs), Field Programmable Gate Arrays (FPGAs), and/or the like), memory 1306, and a network interface 1308. The one or more processors 1304 are also referred to herein as processing circuitry. In addition, the radio access node 1300 may include one or more radio units 1310 that each includes one or more transmitters 1312 and one or more receivers 1314 coupled to one or more antennas 1316. The radio units 1310 may be referred to or be part of radio interface circuitry. In some embodiments, the radio unit(s) 1310 is external to the control system 1302 and connected to the control system 1302 via, e.g., a wired connection (e.g., an optical cable). However, in some other embodiments, the radio unit(s) 1310 and potentially the antenna(s) 1316 are integrated together with the control system 1302. The one or more processors 1304 operate to provide one or more functions of a radio access node 1300 as described herein. In some embodiments, the function(s) are implemented in software that is stored, e.g., in the memory 1306 and executed by the one or more processors 1304.

Figure 14:
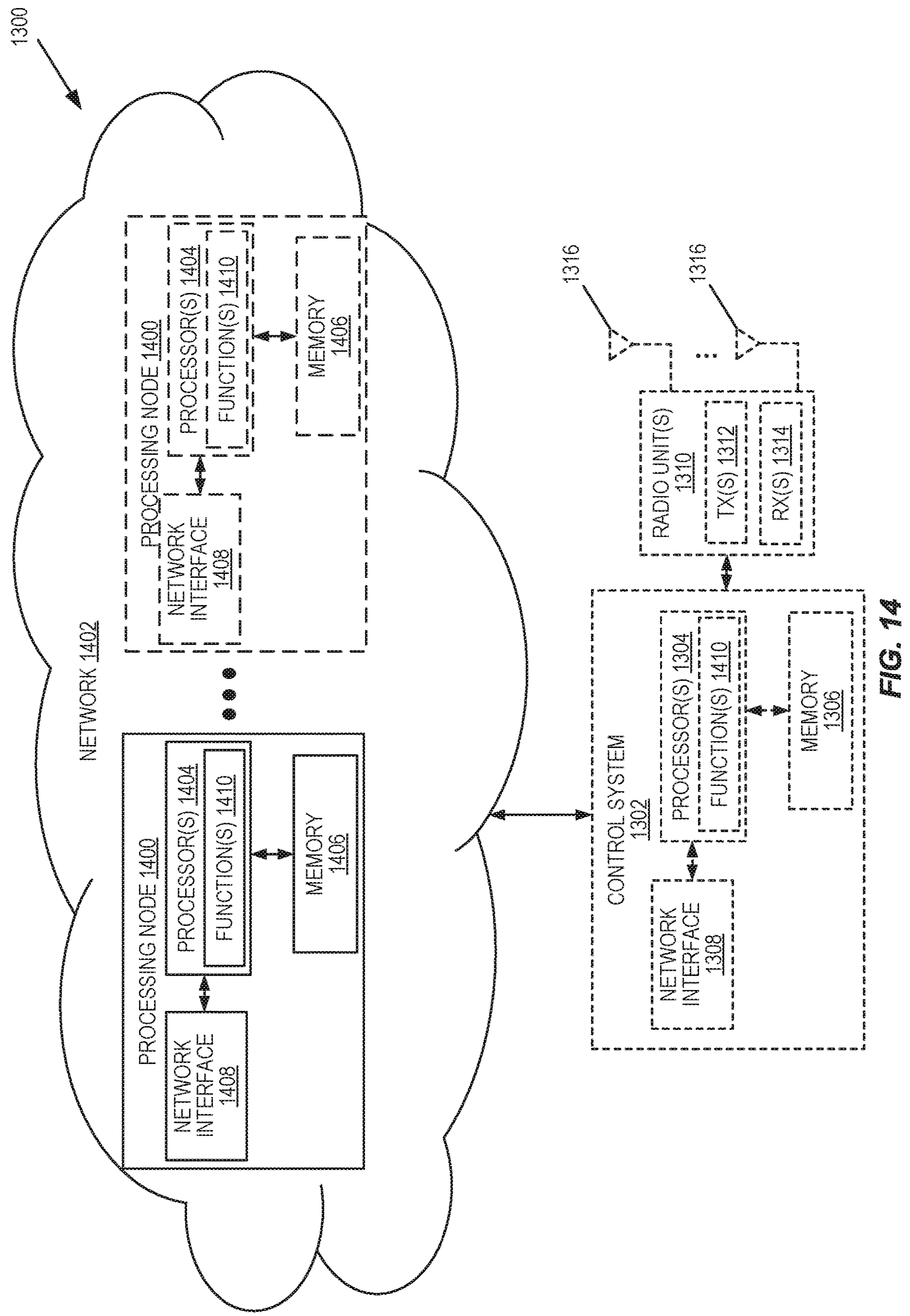
FIG. 14 is a schematic block diagram that illustrates a virtualized embodiment of the radio access node of FIG. 13 according to some embodiments of the present disclosure.

FIG. 14 is a schematic block diagram that illustrates a virtualized embodiment of the radio access node 1300 according to some embodiments of the present disclosure. This discussion is equally applicable to other types of network nodes. Further, other types of network nodes may have similar virtualized architectures. Again, optional features are represented by dashed boxes.

As used herein, a "virtualized" radio access node is an implementation of the radio access node 1300 in which at least a portion of the functionality of the radio access node 1300 is implemented as a virtual component(s) (e.g., via a virtual machine(s) executing on a physical processing node(s) in a network(s)). As illustrated, in this example, the radio access node 1300 may include the control system 1302 and/or the one or more radio units 1310, as described above. The control system 1302 may be connected to the radio unit(s) 1310 via, for example, an optical cable or the like. The radio access node 1300 includes one or more processing nodes 1400 coupled to or included as part of a network(s) 1402. If present, the control system 1302 or the radio unit(s) are connected to the processing node(s) 1400 via the network 1402. Each processing node 1400 includes one or more processors 1404 (e.g., CPUs, ASICs, FPGAS, and/or the like), memory 1406, and a network interface 1408.

In this example, functions 1410 of the radio access node 1300 described herein are implemented at the one or more processing nodes 1400 or distributed across the one or more processing nodes 1400 and the control system 1302 and/or the radio unit(s) 1310 in any desired manner. In some particular embodiments, some or all of the functions 1410 of the radio access node 1300 described herein are implemented as virtual components executed by one or more virtual machines implemented in a virtual environment(s) hosted by the processing node(s) 1400. As will be appreciated by one of ordinary skill in the art, additional signaling or communication between the processing node(s) 1400 and the control system 1302 is used in order to carry out at least some of the desired functions 1410. Notably, in some embodiments, the control system 1302 may not be included, in which case the radio unit(s) 1310 communicate directly with the processing node(s) 1400 via an appropriate network interface(s).

In some embodiments, a computer program including instructions which, when executed by at least one processor, causes the at least one processor to carry out the functionality of radio access node 1300 or a node (e.g., a processing node 1400) implementing one or more of the functions 1410 of the radio access node 1300 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 15:
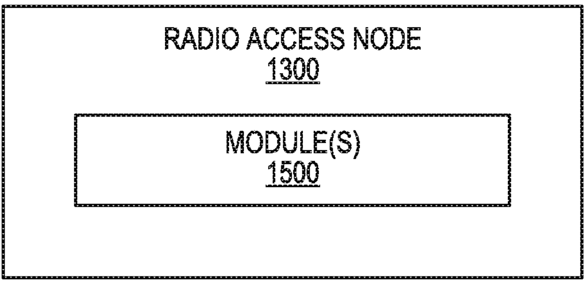
FIG. 15 is a schematic block diagram of the radio access node of FIG. 13 according to some other embodiments of the present disclosure.

FIG. 15 is a schematic block diagram of the radio access node 1300 according to some other embodiments of the present disclosure. The radio access node 1300 includes one or more modules 1500, each of which is implemented in software. The module(s) 1500 provide the functionality of the radio access node 1300 described herein. This discussion is equally applicable to the processing node 1400 of FIG. 14 where the modules 1500 may be implemented at one of the processing nodes 1400 or distributed across multiple processing nodes 1400 and/or distributed across the processing node(s) 1400 and the control system 1302.

Figure 16:
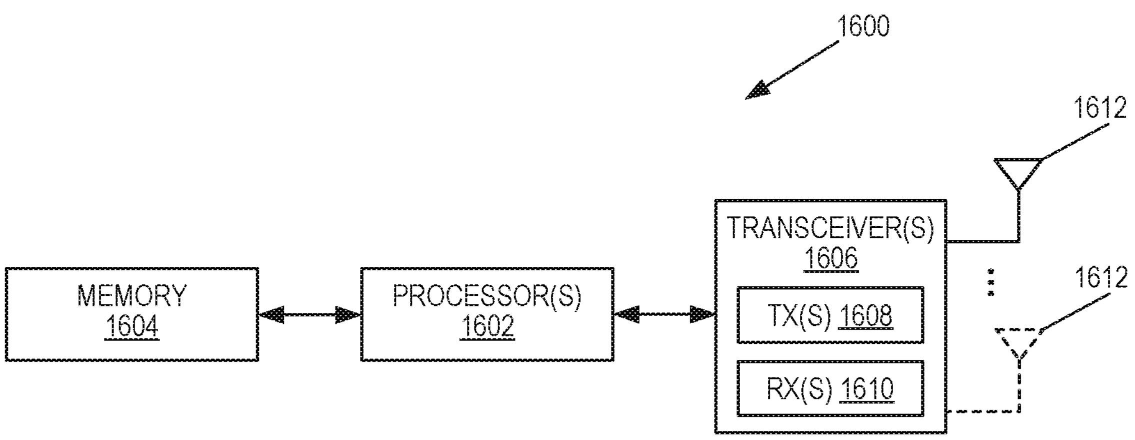
FIG. 16 is a schematic block diagram of a User Equipment device (UE) according to some embodiments of the present disclosure.

FIG. 16 is a schematic block diagram of a wireless communication device 1600 according to some embodiments of the present disclosure. As illustrated, the wireless communication device 1600 includes one or more processors 1602 (e.g., CPUs, ASICS, FPGAs, and/or the like), memory 1604, and one or more transceivers 1606 each including one or more transmitters 1608 and one or more receivers 1610 coupled to one or more antennas 1612. The transceiver(s) 1606 includes radio-front end circuitry connected to the antenna(s) 1612 that is configured to condition signals communicated between the antenna(s) 1612 and the processor(s) 1602, as will be appreciated by on of ordinary skill in the art. The processors 1602 are also referred to herein as processing circuitry. The transceivers 1606 are also referred to herein as radio circuitry. In some embodiments, the functionality of the wireless communication device 1600 described above may be fully or partially implemented in software that is, e.g., stored in the memory 1604 and executed by the processor(s) 1602. Note that the wireless communication device 1600 may include additional components not illustrated in FIG. 16 such as, e.g., one or more user interface components (e.g., an input/output interface including a display, buttons, a touch screen, a microphone, a speaker(s), and/or the like and/or any other components for allowing input of information into the wireless communication device 1600 and/or allowing output of information from the wireless communication device 1600), a power supply (e.g., a battery and associated power circuitry), etc.

In some embodiments, a computer program including instructions which, when executed by at least one processor, causes the at least one processor to carry out the functionality of the wireless communication device 1600 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 17:
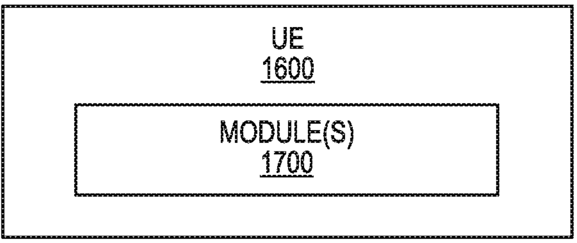
FIG. 17 is a schematic block diagram of the UE of FIG. 16 according to some other embodiments of the present disclosure.

FIG. 17 is a schematic block diagram of the wireless communication device 1600 according to some other embodiments of the present disclosure. The wireless communication device 1600 includes one or more modules 1700, each of which is implemented in software. The module(s) 1700 provide the functionality of the wireless communication device 1600 described herein.

Figure 18:
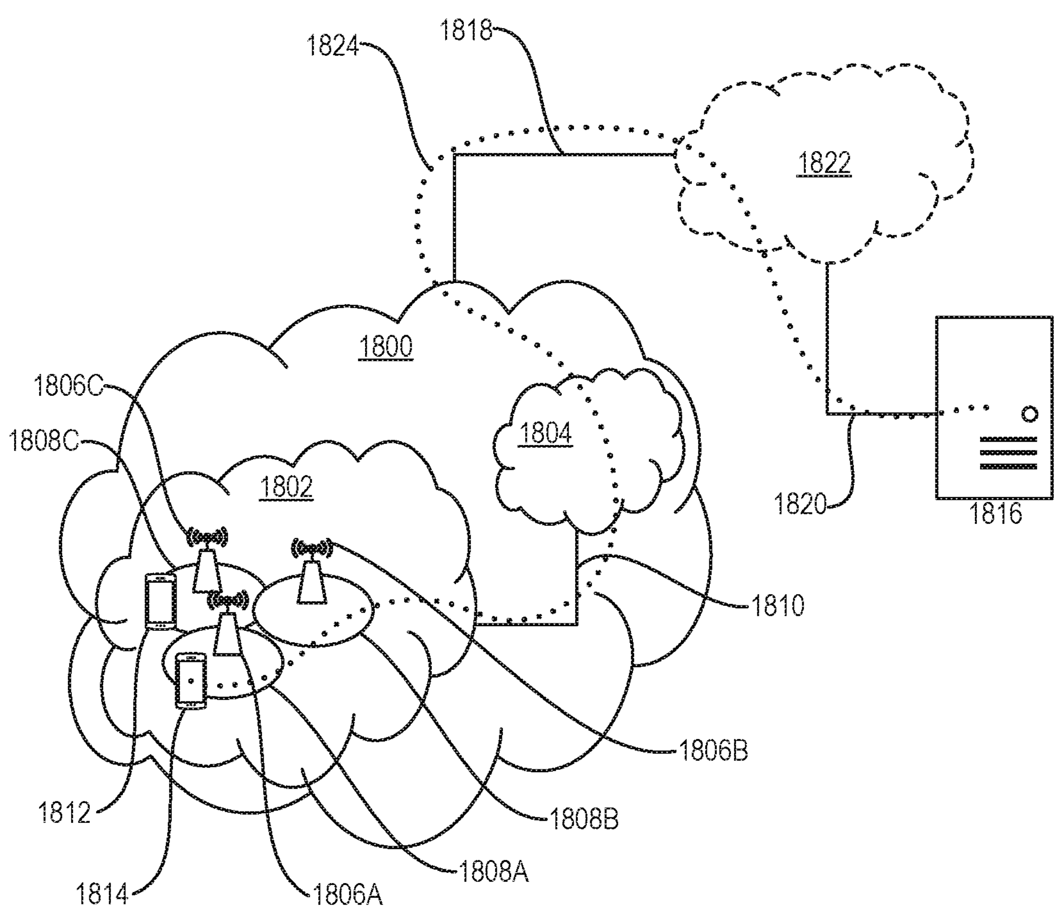
FIG. 18 illustrates a telecommunication network connected via an intermediate network to a host computer in accordance with some embodiments of the present disclosure.

With reference to FIG. 18, in accordance with an embodiment, a communication system includes a telecommunication network 1800, such as a 3GPP-type cellular network, which comprises an access network 1802, such as a RAN, and a core network 1804. The access network 1802 comprises a plurality of base stations 1806A, 1806B, 1806C, such as Node Bs, eNBs, gNBs, or other types of wireless Access Points (APs), each defining a corresponding coverage area 1808A, 1808B, 1808C. Each base station 1806A, 1806B, 1806C is connectable to the core network 1804 over a wired or wireless connection 1810. A first UE 1812 located in coverage area 1808C is configured to wirelessly connect to, or be paged by, the corresponding base station 1806C. A second UE 1814 in coverage area 1808A is wirelessly connectable to the corresponding base station 1806A. While a plurality of UEs 1812, 1814 are illustrated in this example, the disclosed embodiments are equally applicable to a situation where a sole UE is in the coverage area or where a sole UE is connecting to the corresponding base station 1806.

The telecommunication network 1800 is itself connected to a host computer 1816, which may be embodied in the hardware and/or software of a standalone server, a cloud-implemented server, a distributed server, or as processing resources in a server farm. The host computer 1816 may be under the ownership or control of a service provider, or may be operated by the service provider or on behalf of the service provider. Connections 1818 and 1820 between the telecommunication network 1800 and the host computer 1816 may extend directly from the core network 1804 to the host computer 1816 or may go via an optional intermediate network 1822. The intermediate network 1822 may be one of, or a combination of more than one of, a public, private, or hosted network; the intermediate network 1822, if any, may be a backbone network or the Internet; in particular, the intermediate network 1822 may comprise two or more sub-networks (not shown).

The communication system of FIG. 18 as a whole enables connectivity between the connected UEs 1812, 1814 and the host computer 1816. The connectivity may be described as an Over-the-Top (OTT) connection 1824. The host computer 1816 and the connected UEs 1812, 1814 are configured to communicate data and/or signaling via the OTT connection 1824, using the access network 1802, the core network 1804, any intermediate network 1822, and possible further infrastructure (not shown) as intermediaries. The OTT connection 1824 may be transparent in the sense that the participating communication devices through which the OTT connection 1824 passes are unaware of routing of uplink and downlink communications. For example, the base station 1806 may not or need not be informed about the past routing of an incoming downlink communication with data originating from the host computer 1816 to be forwarded (e.g., handed over) to a connected UE 1812. Similarly, the base station 1806 need not be aware of the future routing of an outgoing uplink communication originating from the UE 1812 towards the host computer 1816.

Example implementations, in accordance with an embodiment, of the UE, base station, and host computer discussed in the preceding paragraphs will now be described with reference to FIG. 19. In a communication system 1900, a host computer 1902 comprises hardware 1904 including a communication interface 1906 configured to set up and maintain a wired or wireless connection with an interface of a different communication device of the communication system 1900. The host computer 1902 further comprises processing circuitry 1908, which may have storage and/or processing capabilities. In particular, the processing circuitry 1908 may comprise one or more programmable processors, ASICs, FPGAS, or combinations of these (not shown) adapted to execute instructions. The host computer 1902 further comprises software 1910, which is stored in or accessible by the host computer 1902 and executable by the processing circuitry 1908. The software 1910 includes a host application 1912. The host application 1912 may be operable to provide a service to a remote user, such as a UE 1914 connecting via an OTT connection 1916 terminating at the UE 1914 and the host computer 1902. In providing the service to the remote user, the host application 1912 may provide user data which is transmitted using the OTT connection 1916.

The communication system 1900 further includes a base station 1918 provided in a telecommunication system and comprising hardware 1920 enabling it to communicate with the host computer 1902 and with the UE 1914. The hardware 1920 may include a communication interface 1922 for setting up and maintaining a wired or wireless connection with an interface of a different communication device of the communication system 1900, as well as a radio interface 1924 for setting up and maintaining at least a wireless connection 1926 with the UE 1914 located in a coverage area (not shown in FIG. 19) served by the base station 1918. The communication interface 1922 may be configured to facilitate a connection 1928 to the host computer 1902. The connection 1928 may be direct or it may pass through a core network (not shown in FIG. 19) of the telecommunication system and/or through one or more intermediate networks outside the telecommunication system. In the embodiment shown, the hardware 1920 of the base station 1918 further includes processing circuitry 1930, which may comprise one or more programmable processors, ASICs, FPGAS, or combinations of these (not shown) adapted to execute instructions. The base station 1918 further has software 1932 stored internally or accessible via an external connection.

The communication system 1900 further includes the UE 1914 already referred to. The UE's 1914 hardware 1934 may include a radio interface 1936 configured to set up and maintain a wireless connection 1926 with a base station serving a coverage area in which the UE 1914 is currently located. The hardware 1934 of the UE 1914 further includes processing circuitry 1938, which may comprise one or more programmable processors, ASICs, FPGAs, or combinations of these (not shown) adapted to execute instructions. The UE 1914 further comprises software 1940, which is stored in or accessible by the UE 1914 and executable by the processing circuitry 1938. The software 1940 includes a client application 1942. The client application 1942 may be operable to provide a service to a human or non-human user via the UE 1914, with the support of the host computer 1902. In the host computer 1902, the executing host application 1912 may communicate with the executing client application 1942 via the OTT connection 1916 terminating at the UE 1914 and the host computer 1902. In providing the service to the user, the client application 1942 may receive request data from the host application 1912 and provide user data in response to the request data. The OTT connection 1916 may transfer both the request data and the user data. The client application 1942 may interact with the user to generate the user data that it provides.

Figure 19:
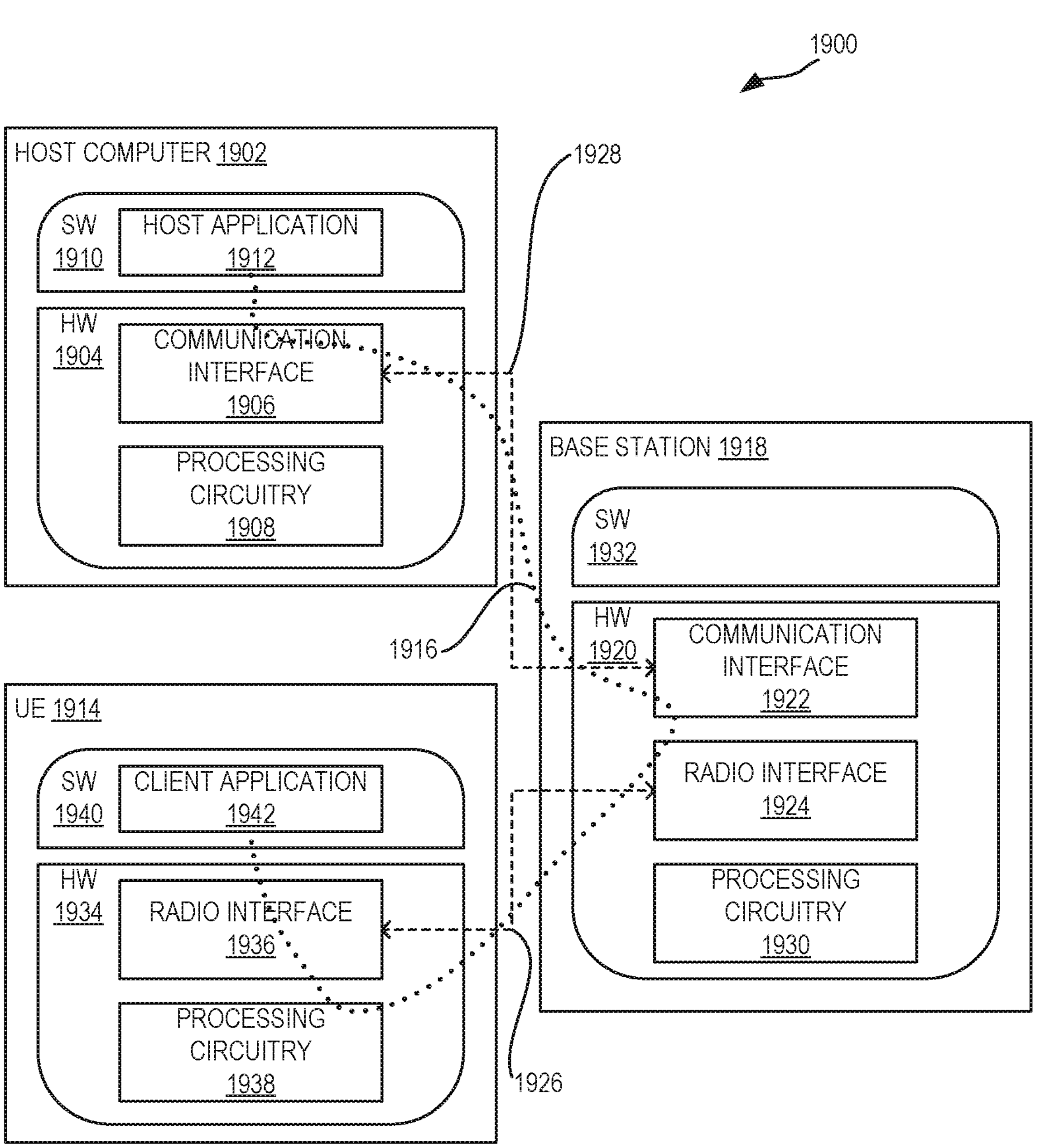
FIG. 19 is a generalized block diagram of a host computer communicating via a base station with a UE over a partially wireless connection in accordance with some embodiments of the present disclosure.

It is noted that the host computer 1902, the base station 1918, and the UE 1914 illustrated in FIG. 19 may be similar or identical to the host computer 1816, one of the base stations 1806A, 1806B, 1806C, and one of the UEs 1812, 1814 of FIG. 18, respectively. This is to say, the inner workings of these entities may be as shown in FIG. 19 and independently, the surrounding network topology may be that of FIG. 18.

In FIG. 19, the OTT connection 1916 has been drawn abstractly to illustrate the communication between the host computer 1902 and the UE 1914 via the base station 1918 without explicit reference to any intermediary devices and the precise routing of messages via these devices. The network infrastructure may determine the routing, which may be configured to hide from the UE 1914 or from the service provider operating the host computer 1902, or both. While the OTT connection 1916 is active, the network infrastructure may further take decisions by which it dynamically changes the routing (e.g., on the basis of load balancing consideration or reconfiguration of the network).

The wireless connection 1926 between the UE 1914 and the base station 1918 is in accordance with the teachings of the embodiments described throughout this disclosure. One or more of the various embodiments improve the performance of OTT services provided to the UE 1914 using the OTT connection 1916, in which the wireless connection 1926 forms the last segment. More precisely, the teachings of these embodiments may improve the e.g., data rate, latency, power consumption, etc. and thereby provide benefits such as e.g., reduced user waiting time, relaxed restriction on file size, better responsiveness, extended battery lifetime, etc.

A measurement procedure may be provided for the purpose of monitoring data rate, latency, and other factors on which the one or more embodiments improve. There may further be an optional network functionality for reconfiguring the OTT connection 1916 between the host computer 1902 and the UE 1914, in response to variations in the measurement results. The measurement procedure and/or the network functionality for reconfiguring the OTT connection 1916 may be implemented in the software 1910 and the hardware 1904 of the host computer 1902 or in the software 1940 and the hardware 1934 of the UE 1914, or both. In some embodiments, sensors (not shown) may be deployed in or in association with communication devices through which the OTT connection 1916 passes; the sensors may participate in the measurement procedure by supplying values of the monitored quantities exemplified above, or supplying values of other physical quantities from which the software 1910, 1940 may compute or estimate the monitored quantities. The reconfiguring of the OTT connection 1916 may include message format, retransmission settings, preferred routing, etc.; the reconfiguring need not affect the base station 1918, and it may be unknown or imperceptible to the base station 1918. Such procedures and functionalities may be known and practiced in the art. In certain embodiments, measurements may involve proprietary UE signaling facilitating the host computer's 1902 measurements of throughput, propagation times, latency, and the like. The measurements may be implemented in that the software 1910 and 1940 causes messages to be transmitted, in particular empty or 'dummy' messages, using the OTT connection 1916 while it monitors propagation times, errors, etc.

Figures 20, 21:
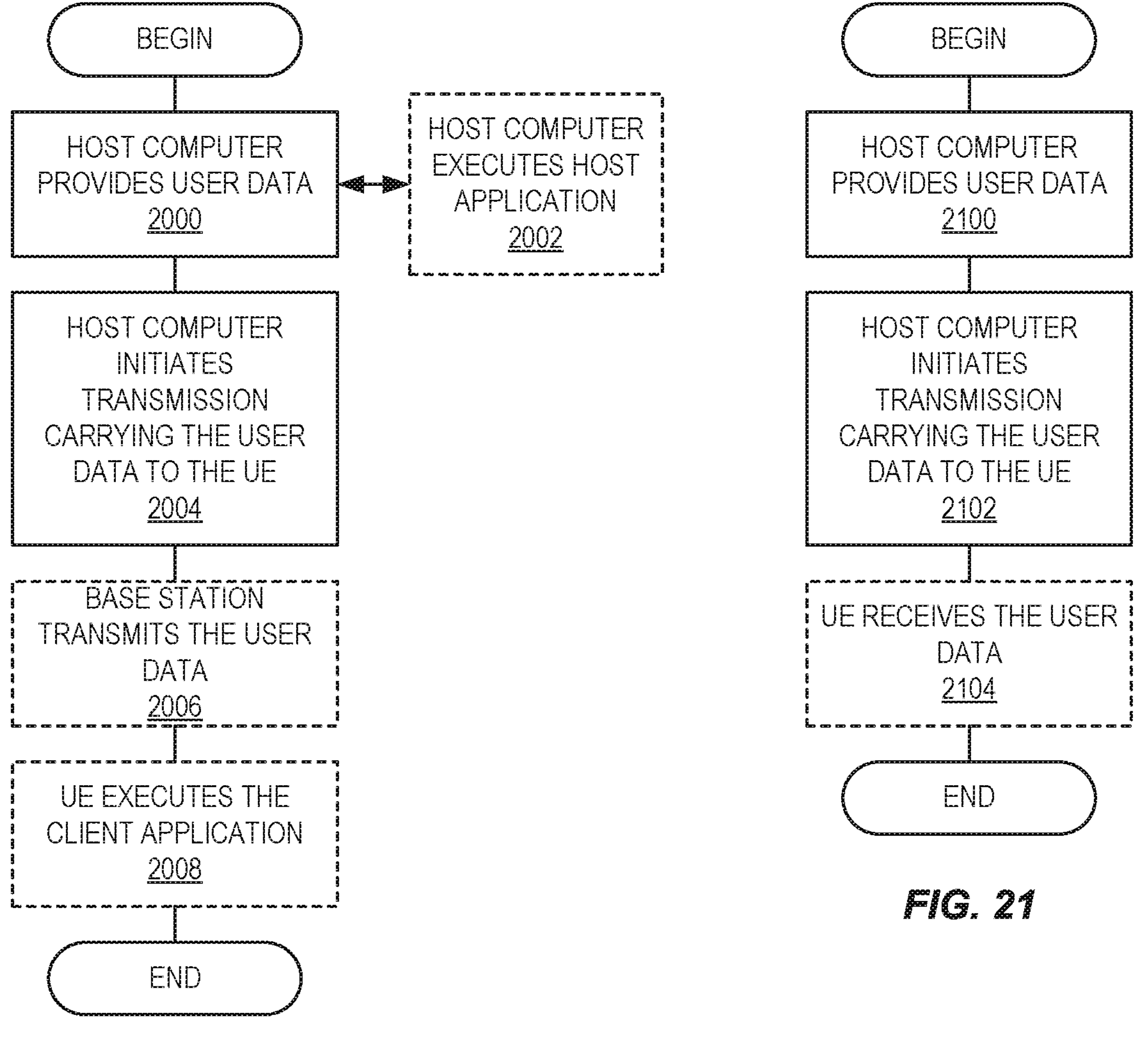
FIG. 20 is a flowchart illustrating a method implemented in a communication system in accordance with one embodiment of the present disclosure.
FIG. 21 is a flowchart illustrating a method implemented in a communication system in accordance with one embodiment of the present disclosure.

FIG. 20 is a flowchart illustrating a method implemented in a communication system, in accordance with one embodiment. The communication system includes a host computer, a base station, and a UE which may be those described with reference to FIGS. 18 and 19. For simplicity of the present disclosure, only drawing references to FIG. 20 will be included in this section. In step 2000, the host computer provides user data. In sub-step 2002 (which may be optional) of step 2000, the host computer provides the user data by executing a host application. In step 2004, the host computer initiates a transmission carrying the user data to the UE. In step 2006 (which may be optional), the base station transmits to the UE the user data which was carried in the transmission that the host computer initiated, in accordance with the teachings of the embodiments described throughout this disclosure. In step 2008 (which may also be optional), the UE executes a client application associated with the host application executed by the host computer.

FIG. 21 is a flowchart illustrating a method implemented in a communication system, in accordance with one embodiment. The communication system includes a host computer, a base station, and a UE which may be those described with reference to FIGS. 18 and 19. For simplicity of the present disclosure, only drawing references to FIG. 21 will be included in this section. In step 2100 of the method, the host computer provides user data. In an optional sub-step (not shown) the host computer provides the user data by executing a host application. In step 2102, the host computer initiates a transmission carrying the user data to the UE. The transmission may pass via the base station, in accordance with the teachings of the embodiments described throughout this disclosure. In step 2104 (which may be optional), the UE receives the user data carried in the transmission.

Figures 22, 23:
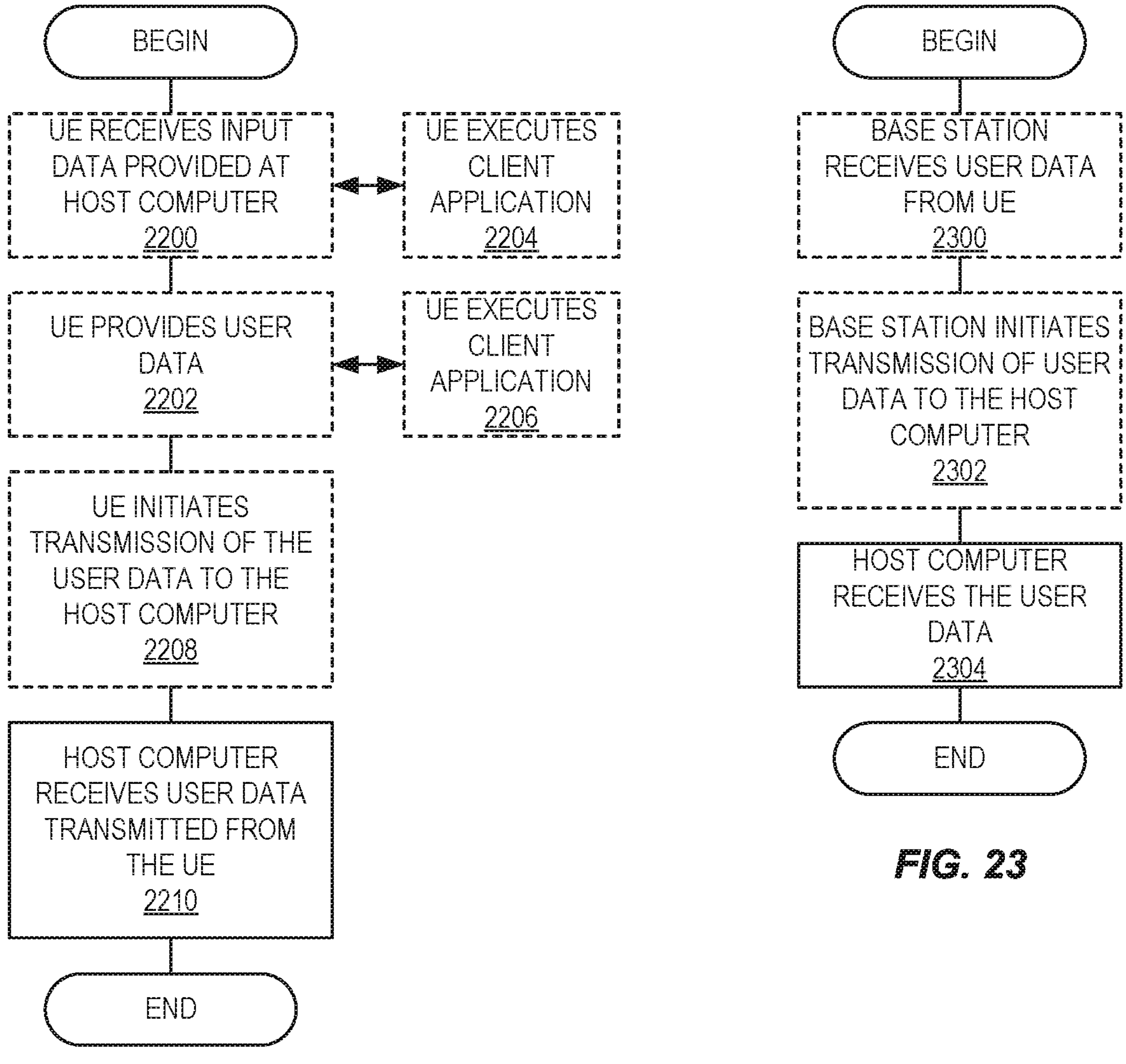
FIG. 22 is a flowchart illustrating a method implemented in a communication system in accordance with one embodiment of the present disclosure.
FIG. 23 is a flowchart illustrating a method implemented in a communication system in accordance with one embodiment of the present disclosure.

FIG. 22 is a flowchart illustrating a method implemented in a communication system, in accordance with one embodiment. The communication system includes a host computer, a base station, and a UE which may be those described with reference to FIGS. 18 and 19. For simplicity of the present disclosure, only drawing references to FIG. 22 will be included in this section. In step 2200 (which may be optional), the UE receives input data provided by the host computer. Additionally or alternatively, in step 2202, the UE provides user data. In sub-step 2204 (which may be optional) of step 2200, the UE provides the user data by executing a client application. In sub-step 2206 (which may be optional) of step 2202, the UE executes a client application which provides the user data in reaction to the received input data provided by the host computer. In providing the user data, the executed client application may further consider user input received from the user. Regardless of the specific manner in which the user data was provided, the UE initiates, in sub-step 2208 (which may be optional), transmission of the user data to the host computer. In step 2210 of the method, the host computer receives the user data transmitted from the UE, in accordance with the teachings of the embodiments described throughout this disclosure.

FIG. 23 is a flowchart illustrating a method implemented in a communication system, in accordance with one embodiment. The communication system includes a host computer, a base station, and a UE which may be those described with reference to FIGS. 18 and 19. For simplicity of the present disclosure, only drawing references to FIG. 23 will be included in this section. In step 2300 (which may be optional), in accordance with the teachings of the embodiments described throughout this disclosure, the base station receives user data from the UE. In step 2302 (which may be optional), the base station initiates transmission of the received user data to the host computer. In step 2304 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processors (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

At least some of the following abbreviations may be used in this disclosure. If there is an inconsistency between abbreviations, preference should be given to how it is used above. If listed multiple times below, the first listing should be preferred over any subsequent listing(s).

| | |
|---|---|
| 3GPP | Third Generation Partnership Project |
| 5G | Fifth Generation |
| 5GC | Fifth Generation Core |
| 5GS | Fifth Generation System |
| AF | Application Function |
| AI | Artificial Intelligence |
| AMF | Access and Mobility Function |
| AN | Access Network |
| AP | Access Point |
| ASIC | Application Specific Integrated Circuit |
| AUSF | Authentication Server Function |
| CIR | Channel Impulse Response |
| CPU | Central Processing Unit |
| DCI | Downlink Control Information |
| DN | Data Network |
| DSP | Digital Signal Processor |
| eNB | Enhanced or Evolved Node B |
| EPS | Evolved Packet System |
| E-UTRA | Evolved Universal Terrestrial Radio Access |
| FPGA | Field Programmable Gate Array |
| GIS | Geographic Information System |
| gNB | New Radio Base Station |
| gNB-DU | New Radio Base Station Distributed Unit |
| HO | Handover |
| HSS | Home Subscriber Server |
| IoT | Internet of Things |
| IP | Internet Protocol |
| ISD | Inter-Site-Distance |
| LTE | Long Term Evolution |
| MAC | Medium Access Control |
| ML | Machine Learning |
| MME | Mobility Management Entity |
| MTC | Machine Type Communication |
| NEF | Network Exposure Function |
| NF | Network Function |
| NR | New Radio |
| NRF | Network Function Repository Function |
| NSSF | Network Slice Selection Function |
| OTT | Over-the-Top |
| PC | Personal Computer |
| PCF | Policy Control Function |
| PDSCH | Physical Downlink Shared Channel |
| P-GW | Packet Data Network Gateway |
| PRS | Positioning Reference Signal |
| QoS | Quality of Service |
| RAM | Random Access Memory |
| RAN | Radio Access Network |
| ROM | Read Only Memory |
| RP | Reception Point |
| RRC | Radio Resource Control |
| RRH | Remote Radio Head |
| RSRP | Reference Signal Received Power |
| RTT | Round Trip Time |
| SAR | Synthetic Aperture Radar |
| SCEF | Service Capability Exposure Function |
| SMF | Session Management Function |
| TCI | Transmission Configuration Indicator |
| TP | Transmission Point |

-continued

| | |
|---|---|
| TRP | Transmission/Reception Point |
| UDM | Unified Data Management |
| UE | User Equipment |
| UPF | User Plane Function |

Those skilled in the art will recognize improvements and modifications to the embodiments of the present disclosure. All such improvements and modifications are considered within the scope of the concepts disclosed herein.

The invention claimed is:

1. A method performed by a base station for determining a landscape type surrounding a User Equipment, UE, served by the base station, the method comprising:

obtaining measurements related to a path-gain between the UE and a plurality of base stations including the serving base station, obtaining the measurements comprising receiving, from the plurality of base stations, the measurements related to the path-gain between the UE and the plurality of base stations based on uplink measurements; and determining the landscape type based on the obtained measurements and a classification model, determining the landscape type based on the obtained measurements comprising determining the landscape type using only strongest N measurements related to the path-gain between the UE and the plurality of base stations.

2. The method of claim 1, wherein obtaining the measurements comprises:

receiving, from the UE, the measurements related to the path-gain between the UE and the plurality of base stations based on downlink measurements.

3. The method of claim 1, wherein the measurements related to the path-gain between the UE and the plurality of base stations comprise a Reference Signal Received Power, RSRP, measurement between the UE and the plurality of base stations.

4. The method of claim 1, wherein N is greater than four.

5. The method of claim 1, wherein the classification model comprises an Artificial Intelligence, AI, or Machine Learning, ML, classification model.

6. The method of claim 5, wherein the classification model is trained with a training set.

7. The method of claim 1, wherein the classification model comprises at least one of the group consisting of: a random forest algorithm, a linear classifier, a quadratic classifier, a support vector machine, a kernel estimator, and a neural network.

8. The method of claim 1, further comprising:

configuring the UE for periodic measurement reporting; and receiving, from the UE, the measurements related to the path-gain between the UE and the plurality of base stations based on downlink measurements.

9. The method of claim 1, wherein determining the landscape type based on the obtained measurements and the classification model comprises:

determining that the landscape type comprises an urban environment when the obtained metrics indicate multiple cells having a small Inter-Site-Distance, ISD.

10. The method of claim 1, wherein determining the landscape type based on the obtained measurements and the classification model comprises:

determining that the landscape type comprises a rural environment when the obtained metrics indicate a single strong path-gain measurement.

11. The method of claim 1, further comprising:

taking at least one action regarding the UE based on the determined landscape type in which the UE is operating.

12. A base station for determining a landscape type surrounding a User Equipment, UE, served by the base station, the base station comprising one or more processors and memory configured to cause the base station to:

obtain measurements related to a path-gain between the UE and a plurality of base stations including the serving base station, obtaining the measurements comprising receiving, from the plurality of base stations, the measurements related to the path-gain between the UE and the plurality of base stations based on uplink measurements; and determine the landscape type based on the obtained measurements and a classification model, determining the landscape type based on the obtained measurements comprising determining the landscape type using only strongest N measurements related to the path-gain between the UE and the plurality of base stations.

13. The base station of claim 12, wherein obtaining the measurements comprises:

receiving, from the UE, the measurements related to the path-gain between the UE and the plurality of base stations based on downlink measurements.

14. The base station of claim 12, wherein the measurements related to the path-gain between the UE and the plurality of base stations comprise a Reference Signal Received Power, RSRP, measurement between the UE and the plurality of base stations.

15. The base station of claim 1, wherein N is greater than four.

16. The base station of claim 12, wherein the classification model comprises an Artificial Intelligence, AI, or Machine Learning, ML, classification model.

* * * * *